US012608724B2

(12) United States Patent
Chuprevich et al.

(10) Patent No.: US 12,608,724 B2
(45) Date of Patent: Apr. 21, 2026

(54) SYSTEMS AND METHODS FOR DISTRIBUTING DIGITAL REWARDS BETWEEN THIRD PARTIES

(71) Applicant: Wells Fargo Bank, N.A., San Francisco, CA (US)

(72) Inventors: John Andrew Chuprevich, Davidson, NC (US); Carrie Anne Hanson, Charlotte, NC (US); David Price, Kennewick, WA (US); Blair Bijou, New York, NY (US); William J. Bailey, Charlotte, NC (US); Joseph de Bruin Tennis, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 39 days.

(21) Appl. No.: 18/469,284

(22) Filed: Sep. 18, 2023

(65) Prior Publication Data

US 2025/0095018 A1      Mar. 20, 2025

(51) Int. Cl.
*G06Q 30/00* (2023.01)
*G06Q 30/0226* (2023.01)

(52) U.S. Cl.
CPC ................................ *G06Q 30/0227* (2013.01)

(58) Field of Classification Search
None
See application file for complete search history.

(56) References Cited

U.S. PATENT DOCUMENTS

| | | | | |
|---|---|---|---|---|
| 6,076,101 | A | * | 6/2000 | Kamakura ......... G06Q 30/0236 |
| | | | | 705/14.27 |
| 8,458,016 | B1 | | 6/2013 | Medina, III |
| 9,100,426 | B1 | * | 8/2015 | Fang ....................... G06F 21/50 |
| 9,135,612 | B1 | | 9/2015 | Proctor, Jr. |
| 11,282,119 | B1 | * | 3/2022 | Kalaboukis ........ G06Q 30/0637 |
| 11,423,384 | B1 | | 8/2022 | Philbrick |
| 11,436,627 | B2 | | 9/2022 | Dedhia |
| 11,449,884 | B2 | | 9/2022 | Bloy |
| 11,606,360 | B1 | | 3/2023 | Rule |

(Continued)

FOREIGN PATENT DOCUMENTS

WO      WO-2017031504 A1 *   2/2017   ......... H04L 63/0492

*Primary Examiner* — Christopher Stroud
(74) *Attorney, Agent, or Firm* — K&L Gates LLP

(57) ABSTRACT

Systems, apparatuses, methods, and computer program products are disclosed for distributing digital rewards between third parties. An example method includes receiving rewards data representative of at least a digital rewards profile comprising a digital rewards amount for a digital rewards program of a user and receiving a rewards mapping request comprising instructions to identify one or more available digital rewards sources compatible with the digital rewards amount. The example method further includes identifying one or more digital rewards sources comprising one or more of a second digital rewards profile comprising a second digital rewards amount, a promotion of the digital rewards program, or an incentive multiplier and causing transmission of at least one of a predefined digital rewards amount or the promotion of the digital rewards program. The example method further includes executing a purchase transaction for a product associated with a product cost of the digital rewards program.

20 Claims, 8 Drawing Sheets

(56)      References Cited

U.S. PATENT DOCUMENTS

| | | | |
|---|---|---|---|
| 2001/0034647 A1* | 10/2001 | Marks ................ | G06Q 30/0241 |
| | | | 705/14.14 |
| 2007/0043657 A1* | 2/2007 | Koenigsman .......... | G06Q 40/00 |
| | | | 705/38 |
| 2010/0121775 A1* | 5/2010 | Keener, Jr. ............. | G06Q 30/02 |
| | | | 705/347 |
| 2011/0320256 A1* | 12/2011 | Florucci .................. | H04W 4/42 |
| | | | 705/14.27 |
| 2012/0233073 A1* | 9/2012 | Salmon ................ | G06Q 20/384 |
| | | | 705/44 |
| 2013/0054327 A1* | 2/2013 | Ross ....................... | G06Q 30/02 |
| | | | 705/14.17 |
| 2014/0237578 A1* | 8/2014 | Bryant ................ | G06F 3/04815 |
| | | | 715/753 |
| 2015/0220924 A1* | 8/2015 | Bakker ................ | G06Q 20/327 |
| | | | 705/14.27 |
| 2017/0176127 A1* | 6/2017 | Ferris .................... | A63F 13/537 |
| 2019/0226018 A1* | 7/2019 | Andruzzi ............. | C12Q 1/6876 |
| 2021/0192496 A1* | 6/2021 | Gregovic ............... | G06N 20/20 |
| 2021/0374790 A1* | 12/2021 | Jennings ............ | G06Q 30/0226 |
| 2023/0120032 A1* | 4/2023 | Sittig ................ | H04M 3/42348 |
| | | | 340/539.13 |

* cited by examiner

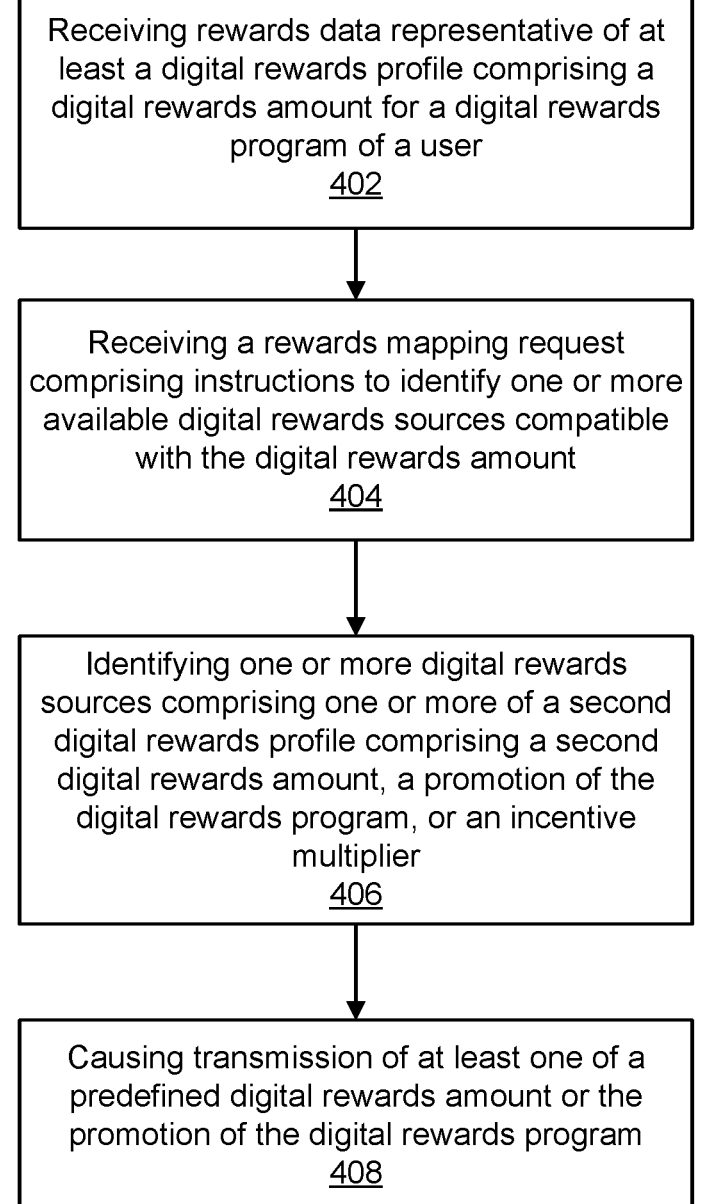

Receiving rewards data representative of at least a digital rewards profile comprising a digital rewards amount for a digital rewards program of a user
402

Receiving a rewards mapping request comprising instructions to identify one or more available digital rewards sources compatible with the digital rewards amount
404

Identifying one or more digital rewards sources comprising one or more of a second digital rewards profile comprising a second digital rewards amount, a promotion of the digital rewards program, or an incentive multiplier
406

Causing transmission of at least one of a predefined digital rewards amount or the promotion of the digital rewards program
408

FIG. 4

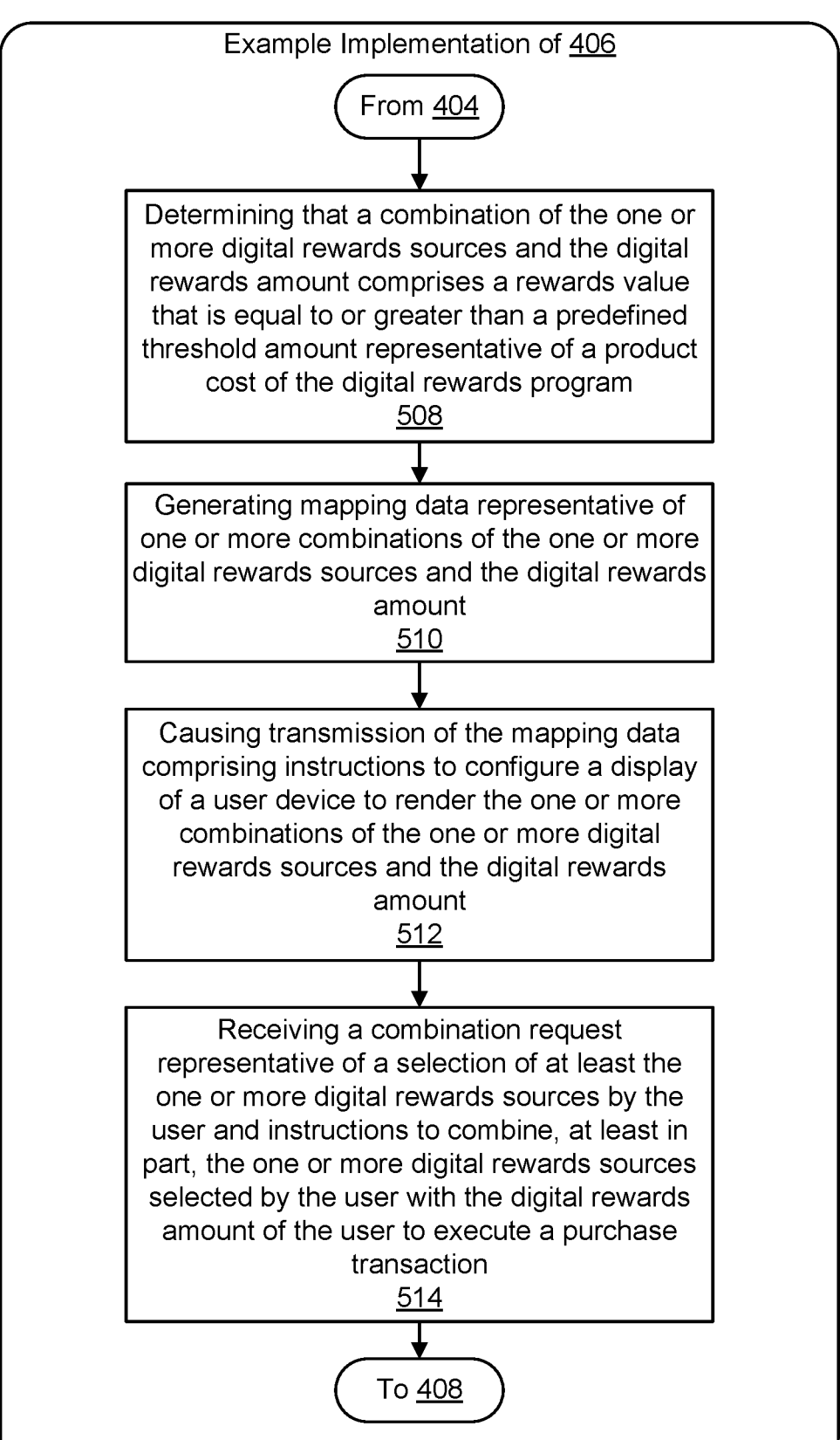

Example Implementation of 406

From 404

Determining that a combination of the one or more digital rewards sources and the digital rewards amount comprises a rewards value that is equal to or greater than a predefined threshold amount representative of a product cost of the digital rewards program
508

Generating mapping data representative of one or more combinations of the one or more digital rewards sources and the digital rewards amount
510

Causing transmission of the mapping data comprising instructions to configure a display of a user device to render the one or more combinations of the one or more digital rewards sources and the digital rewards amount
512

Receiving a combination request representative of a selection of at least the one or more digital rewards sources by the user and instructions to combine, at least in part, the one or more digital rewards sources selected by the user with the digital rewards amount of the user to execute a purchase transaction
514

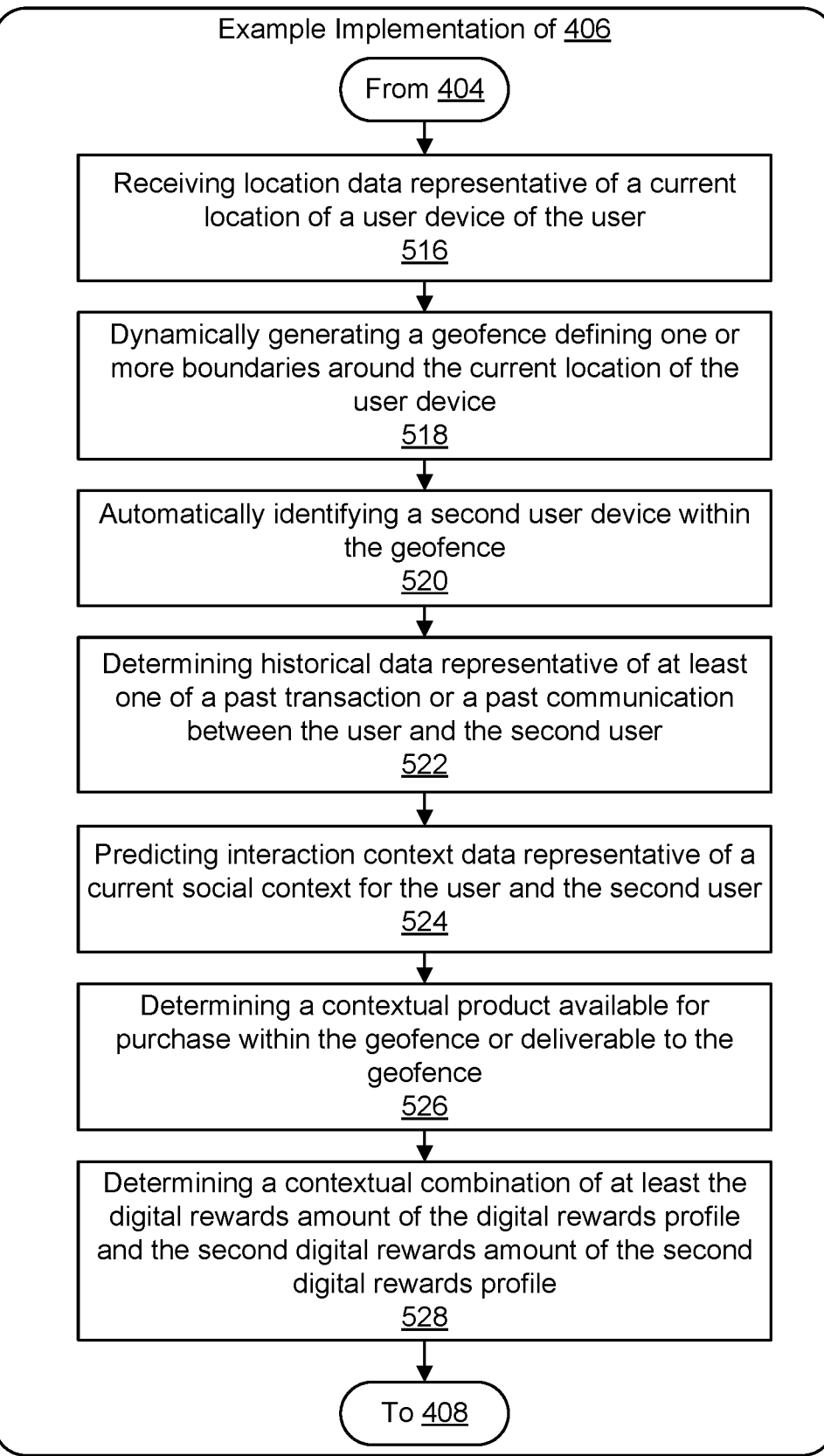

Example Implementation of 406

From 404

Receiving location data representative of a current location of a user device of the user
516

Dynamically generating a geofence defining one or more boundaries around the current location of the user device
518

Automatically identifying a second user device within the geofence
520

Determining historical data representative of at least one of a past transaction or a past communication between the user and the second user
522

Predicting interaction context data representative of a current social context for the user and the second user
524

Determining a contextual product available for purchase within the geofence or deliverable to the geofence
526

Determining a contextual combination of at least the digital rewards amount of the digital rewards profile and the second digital rewards amount of the second digital rewards profile
528

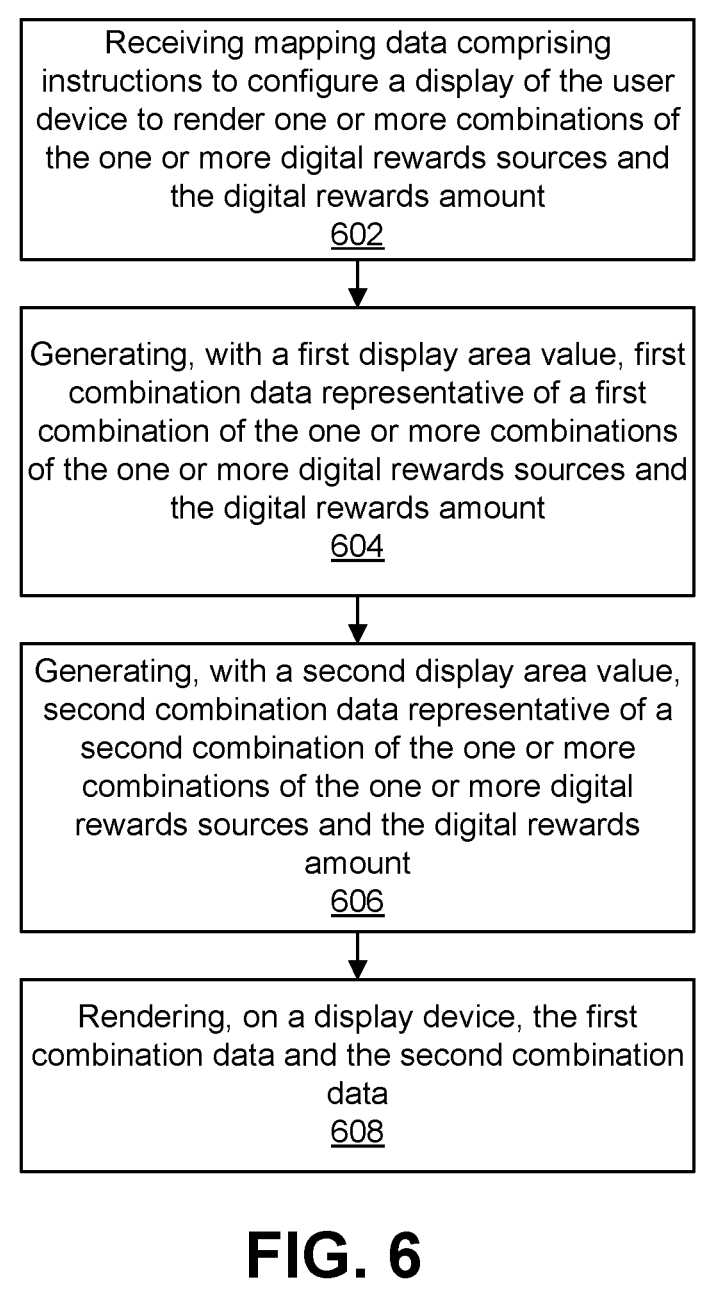

Receiving mapping data comprising instructions to configure a display of the user device to render one or more combinations of the one or more digital rewards sources and the digital rewards amount
602

Generating, with a first display area value, first combination data representative of a first combination of the one or more combinations of the one or more digital rewards sources and the digital rewards amount
604

Generating, with a second display area value, second combination data representative of a second combination of the one or more combinations of the one or more digital rewards sources and the digital rewards amount
606

Rendering, on a display device, the first combination data and the second combination data
608

FIG. 6

SYSTEMS AND METHODS FOR DISTRIBUTING DIGITAL REWARDS BETWEEN THIRD PARTIES

BACKGROUND

Despite the widespread use of traditional banking services, there remains a significant portion of additional assets that cannot integrate with these services. As a result, many individuals are cautious of holding such assets due to a lack of trust in other traditional asset services. At the same time, however, these individuals trust and use banks due to a variety of factors. These individuals stand to benefit from integrating additional assets into the financial system and utilizing these additional assets with banking services such as secure transfers and bill payments.

BRIEF SUMMARY

Many entities (e.g., retailers, restaurants, delivery services, rental services, or the like) may incentivize users with loyalty rewards programs to promote repeat transactions. These loyalty rewards programs often take the form of digital rewards (e.g., pseudo-currencies, coupons, discounts, or the like) that can be redeemed at the entity that issued the digital rewards, such as for products or services. Entities often manage their rewards programs independently through proprietary digital systems (e.g., mobile applications, websites, or the like) or even multiple systems. As a result, users may be enrolled in various different rewards programs each requiring the user to utilize a respective digital system.

Traditionally, it has been difficult for users to track all of their various different rewards programs because each rewards program is isolated within its respective digital system application (e.g., Domino's® Pizza app, Starbucks® app, AMC Stubs®, etc.). The isolation of these digital systems may lead to unfavorable use of the rewards programs for both the user and the issuing entity. For example, a user may accidently create a duplicate profile for a rewards program after forgetting that he or she had already created a rewards profile. This may lead to additional complexity for the user, lost digital rewards because the profiles cannot be merged, or the introduction of unnecessary computing resource burdens on the digital system. Further, the user may not receive all of the digital rewards due to them if his or her correct rewards profile is not being utilized for all pertinent transactions. As a result, the user may never accumulate enough digital rewards to reach a redeemable threshold to purchase additional products or services. In addition, there is typically no way for users to combine their digital rewards either between their own profiles or pooled in a group to reach a redeemable threshold amount (e.g., for group expenses like a shared pizza). This can lead to digital rewards going unused by users and may further result in reduced interactions with the digital rewards system. These scenarios disincentivize users from utilizing the rewards program, which results in the issuing entity of the rewards program losing resources (e.g., monetary, computing, or the like) by causing the issuing entity to maintain an underutilized digital system that does not generate repeat transactions with its user base.

In contrast to these conventional techniques for distributing and tracking digital rewards through individual isolated rewards systems, example embodiments described herein provide a digital rewards aggregation system that may, at least in part, (i) identify digital rewards sources for users across various different digital rewards systems, (ii)

facilitate the transmission of digital rewards between digital rewards profiles of the same or different users, (iii) track user interactions with digital rewards systems and provide incentives for additional user interactions, and (iv) automatically alert users of opportunities to utilize digital rewards. Moreover, the digital rewards aggregation system, as described herein, may be further incorporated with a banking institution's digital payment system or mobile platform (e.g., Zelle®, Paze^SM, Wells Fargo Mobile® app) so that users may track and transfer the majority of their digital assets using a minimum number of digital systems.

Accordingly, the present disclosure sets forth systems, methods, and apparatuses that provide improved tracking and utilization of digital rewards. There are many advantages of these and other embodiments described herein. For instance, the digital rewards aggregation system described herein reduces the computational complexity of tracking digital rewards across various different digital rewards systems by, among other things, automating processes such as identifying available digital rewards sources, mapping combinations of digital rewards sources to reach a redeemable threshold amount, tracking user interactions through the digital rewards aggregation system, and alerting users in real-time or near-real-time of opportunities to utilize digital rewards. By automating these processes, greater efficacy and efficiency is realized because users can track their various different digital rewards with reduced manual review and reduced allocation of computational resources. For example, less application data is required to be stored on a user device because the digital rewards aggregation system may replace other applications. Additionally, less memory allocation and processor usage is required to complete transactions because switching between various different applications to complete a transaction is no longer required.

Further, the digital rewards aggregation system can incentivize users (e.g., by making interactions more streamlined, by providing bonuses for more interactions, or the like) to continue to utilize their various different digital rewards programs which increases the likelihood that entities issuing the rewards programs are not allocating resources, both computational and manpower, to maintain disregarded digital rewards profiles. Furthermore, the digital rewards aggregation system may automatically monitor, among other things, the location of one or more users to predict the context of their current situation to alert the one or more users of combinations of digital rewards sources, e.g., unique to them, that would allow them to redeem a combination of digital rewards, e.g., that conforms to the context of their current situation. For example, a first user may enter a movie theater and, once joined by a second user (e.g., that they have been SMS texting or have had other trackable digital interactions with), the digital rewards aggregation system may automatically predict that the two users are seeing a movie together and then automatically alert the first user and/or the second user that they can combine at least some of their individual digital rewards for a two-person food and drink combo or other products and/or services.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 4 illustrates an example flowchart for distributing digital rewards, in accordance with some example embodiments described herein.

FIG. 5B illustrates an example flowchart for generating combinations of digital rewards sources available to a digital rewards profile, in accordance with some example embodiments described herein.

FIG. 5C illustrates an example flowchart for generating contextual combinations of digital rewards sources available to digital rewards profiles, in accordance with some example embodiments described herein.

FIG. 6 illustrates an example flowchart for rendering combinations of digital rewards sources available to a digital rewards profile, in accordance with some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
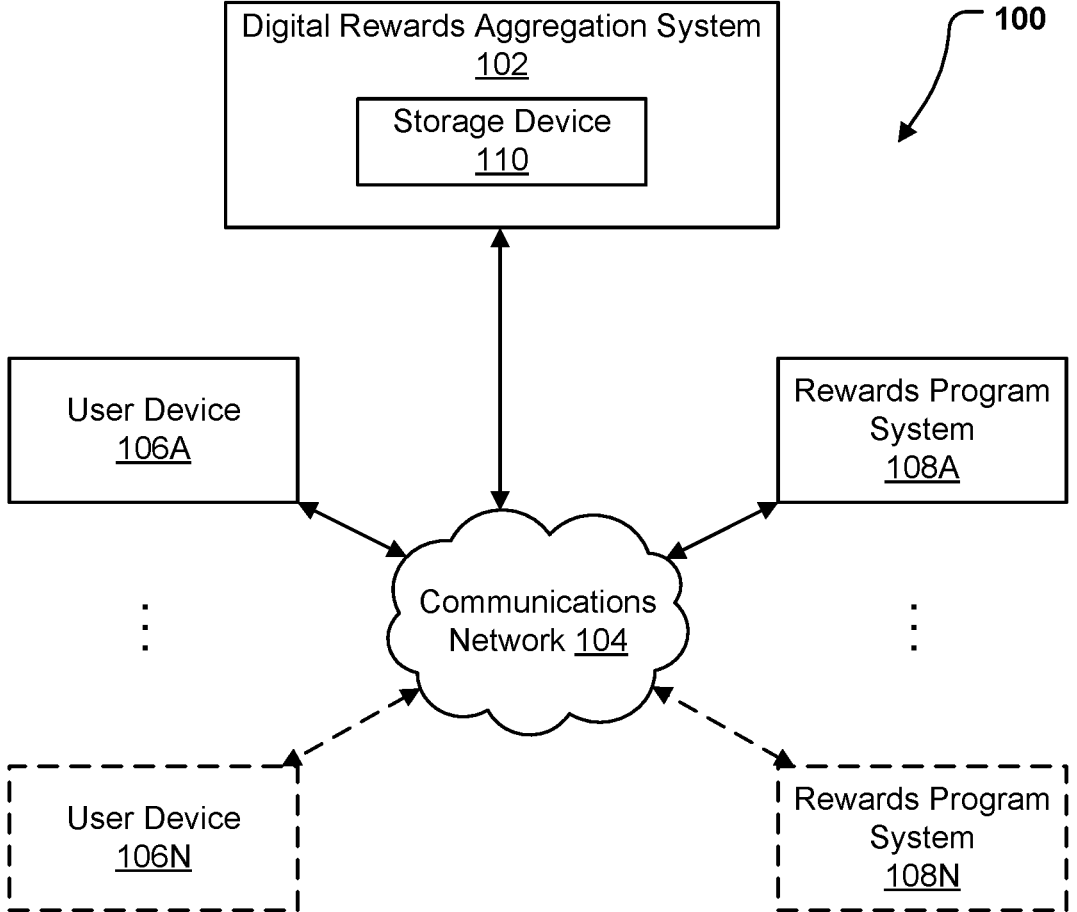
FIG. 1 illustrates a system in which some example embodiments may be used for incorporating a digital rewards management system.

Example embodiments described herein may be implemented using any of a variety of computing devices or servers. To this end, FIG. 1 illustrates an example environment 100 within which various embodiments may operate. As illustrated, a digital rewards aggregation system 102 may receive and/or transmit information via communications network 104 (e.g., the Internet) with any number of other devices, such as one or more of user devices 106A-106N and/or rewards program systems 108A-108N.

The digital rewards aggregation system 102 may be implemented as one or more computing devices or servers, which may be composed of a series of components. Particular components of the digital rewards aggregation system 102 are described in greater detail below with reference to apparatus 200 in connection with FIG. 2.

In some embodiments, the digital rewards aggregation system 102 further includes a storage device 110 that comprises a distinct component from other components of the digital rewards aggregation system 102. Storage device 110 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). Storage device 110 may host the software executed to operate the digital rewards aggregation system 102. Storage device 110 may store information relied upon during operation of the digital rewards aggregation system 102, such as various digital rewards profiles that may be used by the digital rewards aggregation system 102, data and documents to be analyzed using the digital rewards aggregation system 102, or the like. In addition, storage device 110 may store control signals, device characteristics, and access credentials enabling interaction between the digital rewards aggregation system 102 and one or more of the user devices 106A-106N or the rewards program systems 108A-108N.

The one or more user devices 106A-106N and the one or more rewards program systems 108A-108N may be embodied by any computing devices known in the art. The one or more user devices 106A-106N and the one or more rewards program systems 108A-108N need not themselves be independent devices, but may be peripheral devices communicatively coupled to other computing devices.

Although FIG. 1 illustrates an environment and implementation in which the digital rewards aggregation system 102 interacts indirectly with a user via one or more of user devices 106A-106N and/or rewards program systems 108A-108N, in some embodiments users may directly interact with the digital rewards aggregation system 102 (e.g., via communications hardware of the digital rewards aggregation system 102), in which case one or more separate user devices 106A-106N and/or rewards program systems 108A-108N may not be utilized. Whether by way of direct interaction or indirect interaction via another device, a user may communicate with, operate, control, modify, or otherwise interact with the digital rewards aggregation system 102 to perform the various functions and achieve the various benefits described herein.

Example Implementing Apparatuses

Figure 2:
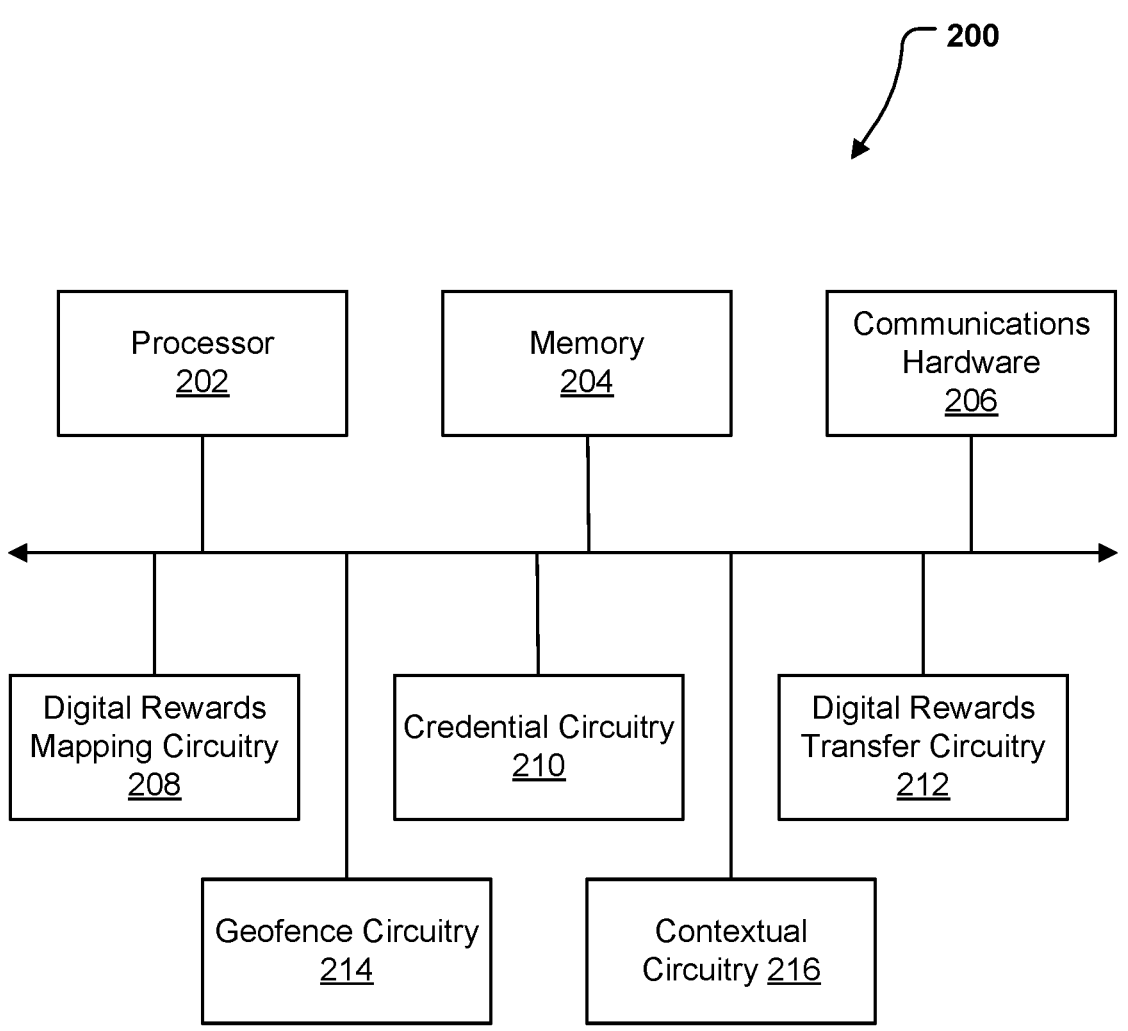
FIG. 2 illustrates a schematic block diagram of example circuitry embodying a system device that may perform various operations in accordance with some example embodiments described herein.

The digital rewards aggregation system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 4-6. As illustrated in FIG. 2, the apparatus 200 may include processor 202, memory 204, communications hardware 206, digital rewards mapping circuitry 208, credential circuitry 210, digital rewards transfer circuitry 212, geofence circuitry 214, and contextual circuitry 216, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor 202 for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises digital rewards mapping circuitry 208 that identifies digital rewards sources available to a user to redeem for products and/or services. The digital rewards mapping circuitry 208 may utilize processor 202, memory 204, or any other hardware component included in the apparatus 200 to perform these operations, as described in connection with FIGS. 4-6 below. The digital rewards mapping circuitry 208 may further utilize communications hardware 206 to gather data from a variety of sources (e.g., user devices 106A-106N or rewards program systems 108A-108N, as shown in FIG. 1), and/or exchange data with a user, and in some embodiments may utilize processor 202 and/or memory 204 to identify digital rewards sources and associated products and/or services. The digital rewards mapping circuitry 208 may leverage the credential circuitry 210 to identify one or more digital rewards profiles associated with a user and then leverage the contextual circuitry 216 to identify products and/or services that may interest the user, or multiple associated users, in real-time or near-real-time. Further, the digital rewards mapping circuitry 208 may map, at least in part, one or more combinations of digital rewards sources across one or more rewards program systems (e.g., rewards program systems 108A-108N) that can be redeemed for one or more products and/or services. In some embodiments, the digital rewards mapping circuitry 208 may generate mapping data representative of one or more combinations of digital rewards sources and a digital rewards amount associated with each of the digital rewards sources. The digital rewards mapping circuitry 208 may further compare the aggregate amount of the digital rewards associated with each of the digital rewards sources to a predefined threshold amount for particular products and/or services to determine whether the aggregate amount can be redeemed for a particular product and/or service, e.g., alone or with additional monetary assets.

In some embodiments, the digital rewards mapping circuitry 208 may be leveraged by a user to define a purchase price and/or a trade value associated with the user's digital rewards. In such embodiments, the user may identify that these digital rewards are available for sale and/or trade to other users of the digital rewards aggregation system 102 at the purchase price and/or a trade value set. Further, the digital rewards mapping circuitry 208 may identify these digital rewards that are for sale and/or trade to other users when generating mapping data for a respective user. In this manner, digital rewards that are for sale and/or trade may be presented publicly to any other users of the digital rewards aggregation system 102 (e.g., via mapped combinations of the digital rewards sources). For example, the user seeking to sell and/or trade their digital rewards may not be in proximity (e.g., within the same geofence) and/or may not have had any previous interactions with the user seeking to receive the digital rewards. In some embodiments, the digital rewards mapping circuitry 208 may determine compatibility between particular digital rewards sources, or the digital rewards thereof, and particular digital rewards programs. The digital rewards mapping circuitry 208 may determine such compatibility by leveraging the communications hardware 206 to compare data representative of both the particular digital rewards sources, or the digital rewards thereof, and the particular digital rewards programs with data provided by one or more of the rewards program systems 108A-108N.

In addition, the apparatus 200 further comprises credential circuitry 210 that verifies one or more credentials associated with a user based on a stored credential associated with a digital rewards profile to associate the user with the digital rewards profile. The credential circuitry 210 may utilize processor 202, memory 204, or any other hardware component included in the apparatus 200 to perform these operations, as described in connection with FIGS. 4-6 below. The credential circuitry 210 may further utilize communications hardware 206 to gather data from a variety of sources (e.g., user devices 106A-106N or rewards program systems 108A-108N, as shown in FIG. 1), and/or exchange data with a user, and in some embodiments may utilize processor 202 and/or memory 204 to verify a user with a digital rewards profile. In some embodiments, the credential circuitry 210 may prevent, at least in part, sensitive information (e.g., personally identifiable information (PII), available digital rewards balances) associated with a user from being transmitted to, or displayed on, user devices 106A-106N.

In addition, the apparatus 200 further comprises digital rewards transfer circuitry 212 that executes digital rewards transfers. For example, the digital rewards transfer circuitry 212 may cause transfer of digital rewards amounts and/or promotions between two or more digital rewards sources such as between two or more digital rewards profiles associated with the same user or different users. The digital rewards transfer circuitry 212 may utilize processor 202, memory 204, or any other hardware component included in the apparatus 200 to perform these operations, as described in connection with FIGS. 4-6 below. The digital rewards transfer circuitry 212 may further utilize communications hardware 206 to gather data from a variety of sources (e.g., user devices 106A-106N or rewards program systems 108A-108N, as shown in FIG. 1), and/or exchange data with a user, and in some embodiments may utilize processor 202 and/or memory 204 to execute digital rewards transfers. In some embodiments, the digital rewards transfer circuitry 212 may execute a purchase transaction for a product and/or service using, at least in part, a digital rewards profile. For example, after transferring a user's digital rewards from a first digital rewards profile to a second digital rewards profile, the digital rewards transfer circuitry 212 may execute a purchase transaction using the second digital rewards profile to redeem at least a portion of the consolidated digital rewards. The digital rewards transfer circuitry 212, in some embodiments, may convert unallocated digital rewards (e.g., credit card rewards points and/or bank rewards points that can be converted to gift cards, or the like) into a digital rewards amount that is compatible with a user's digital rewards profile.

Further, the digital rewards transfer circuitry 212 may cause transfer of digital rewards amounts and/or promotions by utilizing an automated clearing house (ACH) transfer process provided through a banking institution's digital payment system (e.g., Zelle®, Paze℠, Wells Fargo Mobile® app, or the like) that incorporates the digital rewards aggregation system 102. In this manner, at least two digital rewards profiles may be connected via an ACH network or other digital payment system (e.g., distributed ledger technology (DLT), or the like). A batch file may be generated that comprises transaction details for the digital rewards transfer (e.g., a digital rewards amount, credentials to identify each digital rewards profile, etc.), which are then received by the ACH network or other digital payment system. The transaction details may be verified by the digital rewards aggregation system 102, ACH network, or one or more rewards program systems 108A-108N. Once verified, the digital rewards amount and/or promotions may be transferred to the recipient digital rewards profile through a secure connection. The digital rewards transfer circuitry 212 may leverage the credential circuitry 210 to employ various security measures such as encryption, authentication, or the like to ensure the digital rewards transfer is compliant with any applicable regulations, predefined rules, and/or protocols (e.g., established by a government agency, the ACH network, an issuing entity of a digital rewards program, or the like).

In addition, the apparatus 200 further comprises geofence circuitry 214 that generates geofence boundaries based on the current location of a user device. The geofence circuitry 214 may utilize processor 202, memory 204, or any other hardware component included in the apparatus 200 to perform these operations, as described in connection with FIGS. 4-6 below. The geofence circuitry 214 may further utilize communications hardware 206 to gather data from a variety of sources (e.g., user devices 106A-106N or rewards program systems 108A-108N, as shown in FIG. 1), and/or exchange data with a user, and in some embodiments may utilize processor 202 and/or memory 204 to generate geofence boundaries. The geofence circuitry 214 may utilize geolocation mapping services (e.g., Google Maps™, global position system (GPS), and/or the like) and/or location data received from one or more user devices 106A-106N to determine a current location of one or more users. Additionally, the geofence circuitry 214 may utilize the geolocation mapping services and the location data associated with a user to identify structural boundaries (e.g., building walls, fences, or the like) at the current location of the user. These structural boundaries may be used to identify products and/or services available to the user at their current location. In some embodiments, the geofence circuitry 214 may identify a plurality of user devices (e.g., user devices 106A-106N) within a generated geofence that can utilize the digital rewards aggregation system 102.

In addition, the apparatus 200 further comprises contextual circuitry 216 that predicts the interaction context of a user's current social situation and, based thereon, determines contextual combinations of digital rewards sources and products for the user. The contextual circuitry 216 may utilize processor 202, memory 204, or any other hardware component included in the apparatus 200 to perform these operations, as described in connection with FIGS. 4-6 below. The contextual circuitry 216 may further utilize communications hardware 206 to gather data from a variety of sources (e.g., user devices 106A-106N or rewards program systems 108A-108N, as shown in FIG. 1), and/or exchange data with a user, and in some embodiments may utilize processor 202 and/or memory 204 to predict a user's interaction context and determine likely contextual combinations to provide to the user. In some embodiments, the contextual circuitry 216 may leverage the geofence circuitry 214 to predict the interaction context of a user's current social situation. For example, if a user's current location is proximate a geofence for a movie theater, but not within the geofence, the contextual circuitry 216 may predict that the user is waiting to purchase movie tickets and, in response, determine contextual combinations of digital rewards sources for purchasing movie tickets. Additionally, when the user's current location transitions to within the geofence for the movie theater, the contextual circuitry 216 may predict that the user is waiting to purchase concessions and, in response, determine contextual combinations of digital rewards sources for purchasing movie theater concessions. The contextual circuitry 216 may receive historical data (e.g., from user devices 106A-106N, rewards program systems 108A-108N, a mobile network, or the like) representative of a past transaction (e.g., money transfer, digital rewards transfer, or the like) and/or a past communication (e.g., SMS text, phone call, saved to each other's contacts, or the like) between two or more users.

Although components 202-216 are described in part using functional language, it will be understood that the particular implementations necessarily include the use of particular hardware. It should also be understood that certain of these components 202-216 may include similar or common hardware. For example, the digital rewards mapping circuitry 208, credential circuitry 210, digital rewards transfer circuitry 212, geofence circuitry 214, and contextual circuitry 216 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the digital rewards mapping circuitry 208, credential circuitry 210, digital rewards transfer circuitry 212, geofence circuitry 214, and contextual circuitry 216 may leverage the processor 202, memory 204, or communications hardware 206 as described above, it will be understood that any of digital rewards mapping circuitry 208, credential circuitry 210, digital rewards transfer circuitry 212, geofence circuitry 214, and contextual circuitry 216 may include one or more dedicated processor, specially configured field programmable gate array (FPGA), or application specific interface circuit (ASIC) to perform its corresponding functions, and may accordingly leverage the processor 202 for executing software stored in a memory (e.g., memory 204), or communications hardware 206 for enabling any functions not performed by special-purpose hardware. In all embodiments, however, it will be understood that digital rewards mapping circuitry 208, credential circuitry 210, digital rewards transfer circuitry 212, geofence circuitry 214, and contextual circuitry 216 comprise particular machinery designed for performing the functions described herein in connection with such elements of apparatus 200.

Figure 3:
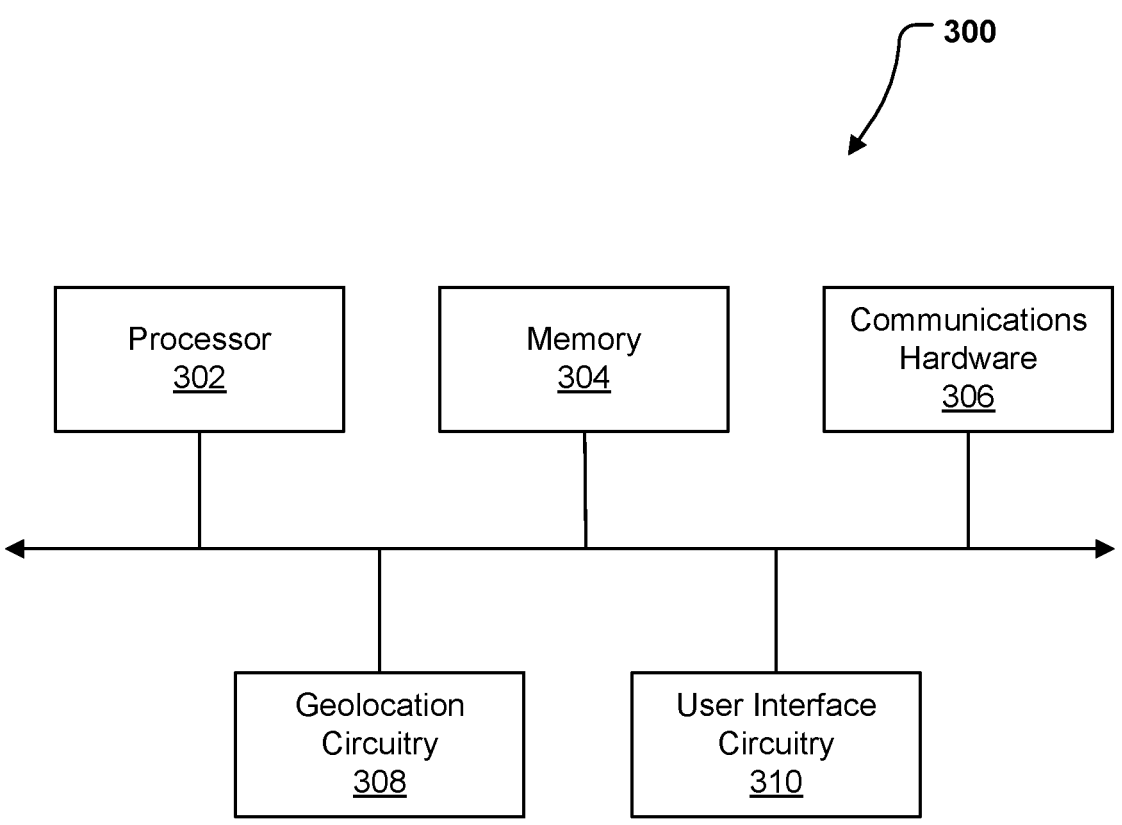
FIG. 3 illustrates a schematic block diagram of example circuitry embodying a user device and/or rewards program system that may perform various operations in accordance with some example embodiments described herein.

As illustrated in FIG. 3, an apparatus 300 is shown that represents an example user device (e.g., any of user devices 106A-106N) or an example rewards program system (e.g., any of rewards program systems 108A-108N). The apparatus 300 includes processor 302, memory 304, and communications hardware 306, each of which is configured to be similar to the similarly named components described above in connection with FIG. 2.

However, the apparatus 300 may also include geolocation circuitry 308, which includes hardware components designed for communicatively coupling with a satellite-based radio navigation system (e.g., global positioning system (GPS)) and/or a cellular network to determine the current location for the apparatus 300 (e.g., via GPS coordinates, radiolocation through triangulation between base station, or the like). The geolocation circuitry 308 may utilize processor 302, memory 304, or any other hardware component included in the apparatus 300 to perform these operations, as described in connection with FIGS. 4-6 below. The geolocation circuitry 308 may further utilize communications hardware 306 to communicate with navigation systems, cellular networks, and/or apparatus 200, or may otherwise utilize processor 302 and/or memory 304 to generate location data representative of the current location of the apparatus 300. In some embodiments, the geolocation circuitry 308 may identify the location of a point-of-sale device associated with a particular rewards program system (e.g., rewards program systems 108A-108N).

Some example embodiments of a point-of-sale device associated with a rewards program system may include, without limitation, a digital menu in a fast food restaurant, vending machine, digital kiosk, interactive digital signage, some or all of apparatus 300 as described herein, or the like. In some embodiments, the point-of-sale device associated with a rewards program system is a special-purpose machine comprising communications hardware 306 with near-field communication (NFC) sub-circuitry including protocols for active or passive low/high/ultra-high frequency radio-frequency identification (RFID), Bluetooth®, or the like for automatically detecting one or more user devices within a predefined NFC range (e.g., up to and including 100 meters or more). The point-of-sale device associated with a rewards program system may automatically scan passing user devices to determine if a user device is associated with the same rewards program system, e.g., via a digital rewards profile associated with the user device. Once the point-of-sale device detects a user device associated with the same rewards program system, the point-of-sale device may record one or more of location data, interaction context data, rewards data, or other data associated with a user as described herein and then cause transmission of the (at least temporarily) recorded data to the digital rewards aggregation system 102 for use with one or more operations described below in connection with FIGS. 4-6.

In some embodiments, the credential circuitry 210 of the digital rewards aggregation system 102 may leverage at least a point-of-sale device of a rewards program system (e.g., any of rewards program systems 108A-108N) to authenticate location data provided by a user device (e.g., any of user devices 106A-106N) to prevent fraud. For example, to receive a special promotion, a retailer may require a user to visit one of their participating store locations before the user can accept transfer of the special promotion to their digital rewards profile. In addition to confirming the user's location is within a participating store location using the geofence circuitry 214, the digital rewards aggregation system 102 may also require the user to identify themselves to one or more point-of-sale devices at the participating store location using near-field communication (NFC) sub-circuitry of communications hardware 306. In some embodiments, a first user's location may be authenticated utilizing geofence circuitry 214 and the digital rewards aggregation system 102 may also require the first user to identify themselves to one or more other users within the geofence using, at least in part, NFC sub-circuitry of communications hardware 306. For example, two or more users seeking to combine their digital rewards may have to verify each other's location data and/or security credentials via NFC sub-circuitry of communications hardware 306. Advantages to utilizing such systems are that they prevent dishonest users, or other bad actors (e.g., hackers, thieves, etc.), from claiming such special promotions by falsifying the location data for their user device (e.g., using false GPS applications to mask their true location data).

In addition, the apparatus 300 may also include user interface circuitry 310, which includes hardware components designed for receiving user inputs and rendering virtual graphics outputs. The user interface circuitry 310 may utilize processor 302, memory 304, or any other hardware component included in the apparatus 300 to perform these operations, as described in connection with FIGS. 4-6 below. The user interface circuitry 310 may further utilize communications hardware 306 to transmit data representative of a user input and/or receive data to render as a virtual graphics output, or may otherwise utilize processor 302 and/or memory 304 to generate data representative of a user input and/or generate virtual graphics output, e.g., from based on received data. The user interface circuitry 310 may comprise one or more of a keyboard, pointing device, touchscreen, microphone with speech recognition interface, camera with gesture-based interface, or other input device capably of receiving various different user inputs. In addition, the user interface circuitry 310 may comprise a display device including one or more of a screen with graphical user interface (GUI), speaker, light emitting diode (LED), haptic technology device, or other output device capable of rendering information to a user.

In some embodiments, various components of the apparatus 200 and apparatus 300 may be hosted remotely (e.g., by one or more cloud servers) and thus need not physically reside on the corresponding apparatus (e.g., apparatus 200, apparatus 300, or the like). For instance, some components of the apparatus 200 may not be physically proximate to the other components of apparatus 200. Similarly, some or all of the functionality described herein may be provided by third party circuitry. For example, a given apparatus 200, or 300, may access one or more third party circuitries in place of local circuitries for performing certain functions.

As will be appreciated based on this disclosure, example embodiments contemplated herein may be implemented by an apparatus 200 or 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatuses (e.g., apparatus 200 and apparatus 300), example embodiments are described below in connection with a series of flowcharts.

Example Operations

Figure 5A:
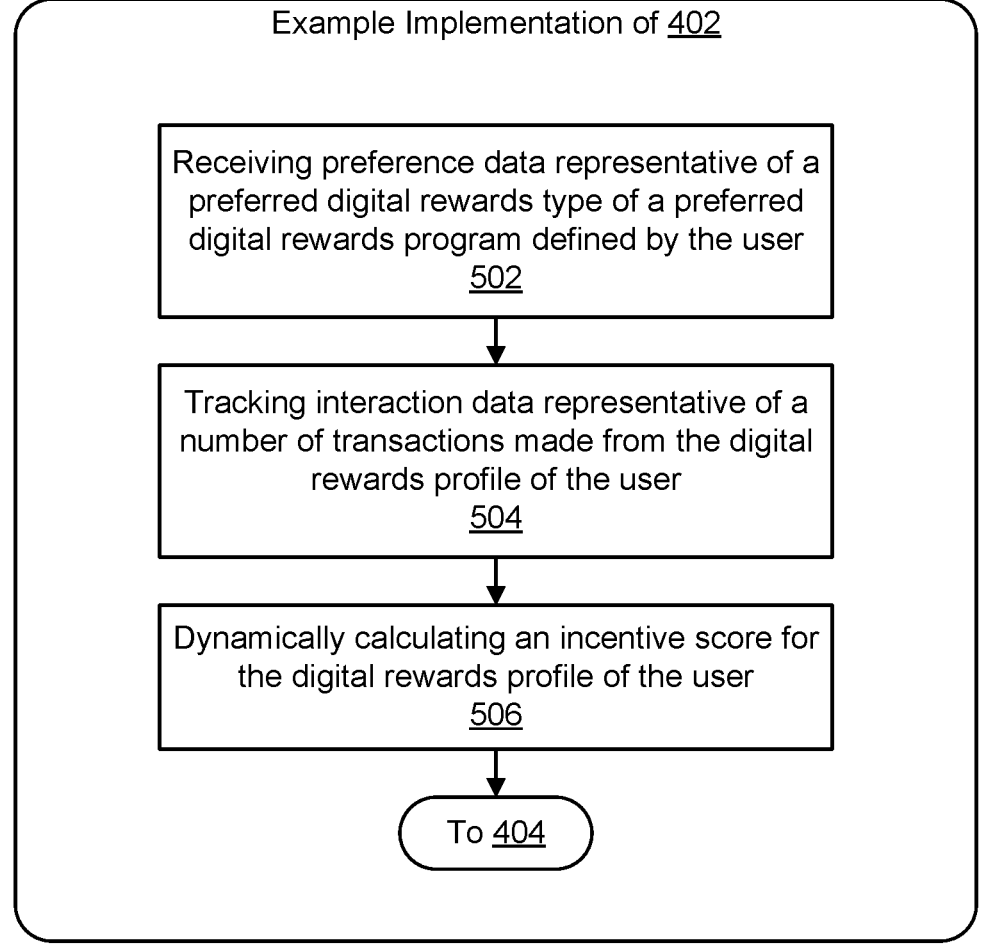
FIG. 5A illustrates an example flowchart for determining an incentive score for a digital rewards profile, in accordance with some example embodiments described herein.

Turning to FIGS. 4-6, example flowcharts are illustrated that contain example operations implemented by example embodiments described herein. The operations illustrated in FIGS. 4 and 5A-5C may, for example, be performed by a system device (e.g., server, etc.) of the digital rewards aggregation system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, digital rewards mapping circuitry 208, credential circuitry 210, digital rewards transfer circuitry 212, geofence circuitry 214, contextual circuitry 216, and/or any combination thereof. It will be understood that user interaction with the digital rewards aggregation system 102 may occur directly via communications hardware 206, or may instead be facilitated by a separate user device (e.g., any of user devices 106A-106N shown in FIG. 1, which may in turn be embodied by an apparatus 300, which is shown and described in connection with FIG. 3), as shown in FIG. 1, and which may have similar or equivalent physical componentry facilitating such user interaction.

Meanwhile, the various operations described in connection with FIG. 6 may, for example, be performed by at least a user device of user devices 106A-106N shown in FIG. 1, which may in turn be embodied by an apparatus 300, which is shown and described in connection with FIG. 3. To perform the operations described below, the apparatus 300 may utilize one or more of processor 302, memory 304, communications hardware 306, geolocation circuitry 308, user interface circuitry 310, and/or any combination thereof.

Turning first to FIG. 4, example operations are shown for distributing digital rewards.

As shown by operation 402, the apparatus 200 may include means, such as processor 202, memory 204, communications hardware 206, credential circuitry 210, or the like, for receiving rewards data representative of at least a digital rewards profile comprising a digital rewards amount for a digital rewards program of a user. The rewards data may indicate identifiable information for associating a user with a digital rewards profile, such as, for example, an account number, user identifier (e.g., username, password, etc.), phone number, or the like associated with the respective digital rewards profile. Still additional data (e.g., preference data, location data, historical data, or any other data as described herein) may be provided with the rewards data. The rewards data may also include information about the digital rewards associated with each respective digital rewards profile. Digital rewards may comprise, and be identified by, a rewards type (e.g., points, gift card, discount, or the like) and a rewards amount (e.g., number of points, equivalent monetary value, discounted percentage, or the like). For example, the rewards data may indicate that a first digital rewards profile of a first user comprises 100 rewards points, $50.00 in gift cards, and no coupons and that a second digital rewards profile of a second user comprises 0 rewards points, $10.00 in gift cards, and a coupon for a one-time 10% discount with any purchase. It should be understood that rewards points may correlate to a monetary value (e.g., 10 points equals $1.00) and/or rewards points may correlate to another metric defined by the issuing entity (e.g., 1000 points equals 1 flight mile, 500 points equals 1 hotel night, or the like). Additionally, the rewards data may indicate the digital rewards program and the issuing entity (e.g., retailer, service provider, etc.) thereof associated with the digital rewards profiles. The digital rewards program and the issuing entity may be identified, at least in part, through identifiable information associated with a rewards program system (e.g., any of rewards program systems 108A-108N), such as, for example, the MAC address or IP address of a hosting server, by an identifier assigned by the digital rewards aggregation system 102, a cryptographic protocol certificate, digital signature, and/or the like.

Still with reference to operation 402, in some embodiments, the credential circuitry 210 may generate a batch file comprising identifiable information for a user, an inquiry request for one or more digital rewards profiles of the user, and any additional data required to authenticate the batch file (e.g., a cryptographic protocol certificate, or the like). The inquiry request may comprise instructions to return rewards data comprising information about the digital rewards associated with each respective digital rewards profile identified in the batch file. The communications hardware 306 may then cause transmission of the batch file to a device (e.g., server, etc.) of a rewards program system (e.g., any of rewards program systems 108A-108N) to prompt the rewards program system to provide the requested rewards data back to the digital rewards aggregation system 102. Upon receipt of the inquiry request, the recipient rewards program system may generate and cause transmission of another batch file comprising the requested rewards data back to the digital rewards aggregation system 102. In some embodiments, operation 402 may further comprise the receipt of additional data and/or the performance of additional operations as will be described in greater detail below in connection with FIG. 5A.

As shown by operation 404, the apparatus 200 may include means, such as processor 202, memory 204, communications hardware 206, digital rewards mapping circuitry 208, or the like, for receiving a rewards mapping request comprising instructions to identify one or more available digital rewards sources compatible with the digital rewards amount. The rewards mapping request may be representative of a request to inform the user of combinations of digital rewards sources, each comprising a rewards type and a rewards amount as described herein, and products that are available to the user, or a plurality of associated users, in real-time or near-real-time and/or at the user's current location. The rewards mapping request may indicate one or more of a digital rewards profile, rewards program system (e.g., any of rewards program systems 108A-108N), product, service, cost associated with a product or service (e.g., monetary value, digital rewards amount, or the like), or any other information as described herein for identifying at least one combination of digital rewards sources and products and/or services to at least one user. For example, a rewards mapping request may indicate a digital rewards profile that a user desires to utilize digital rewards from and the digital rewards mapping circuitry 208 may query digital rewards sources and/or digital rewards programs that are compatible with the indicated digital rewards profile. As another example, a rewards mapping request may indicate a product or service that a user desires to receive and the digital rewards mapping circuitry 208 may automatically select one or more digital rewards profiles previously authenticated (e.g., by credential circuitry 210) for the user that are associated with the indicated product or service. Once the one or more digital rewards profiles are selected the digital rewards mapping circuitry 208 may query digital rewards sources and/or digital rewards programs that are compatible with the selected digital rewards profiles and the indicated product or service.

In some embodiments, a rewards mapping request may be generated by a user device (e.g., any of user devices 106A-106N) in response to a user input indicating a request to identify at least one combination of digital rewards sources and products and/or services to a user. The user device may cause transmission of the generated rewards mapping request to communications hardware 206, e.g., to cause the digital rewards aggregation system 102 to identify at least one combination of digital rewards sources and products and/or services to the user. In response, the digital rewards aggregation system 102 may generate and cause transmission of an alert providing a response to the rewards mapping request back to the user device. In some embodiments, the alert providing the response to the rewards mapping request may indicate at least one combination of digital rewards sources and products and/or services. In some embodiments, the alert providing the response to the rewards mapping request may indicate that the user does not have sufficient digital rewards to redeem at the current time.

In some embodiments, a rewards mapping request may be generated by a rewards program system (e.g., any of rewards program systems 108A-108N) to promote specific products and/or services to a user. The rewards program system may automatically generate one or more rewards mapping requests in response to one or more of (i) detection of one or more user devices (e.g., any of user devices 106A-106N) at a predefined location, (ii) detection of one or more user devices within a predefined NFC range of a point-of-sale device associated with a rewards program system, (iii) a determination that at least a portion of a user's digital rewards are within an expiration threshold period (e.g., 5 days until expiration, or the like), (iv) a promotion event associated with the rewards program system (e.g., holiday sales, new product launch, or the like), or any other criteria for generating a rewards mapping request as described herein. The rewards program system may cause transmission of the generated rewards mapping request to communications hardware 206, e.g., to cause the digital rewards aggregation system 102 to identify at least one combination of digital rewards sources and products and/or services to at least one user, e.g., via an alert to their user device. In some embodiments, automatic alerts may be generated to notify the user of any or all of a user's digital rewards that are within an expiration threshold period.

As shown by operation 406, the apparatus 200 may include means, such as processor 202, memory 204, communications hardware 206, digital rewards mapping circuitry 208, or the like, for identifying one or more digital rewards sources comprising one or more of a second digital rewards profile comprising a second digital rewards amount, a promotion of the digital rewards program, or an incentive multiplier. In some embodiments, a digital rewards source may include any source of digital rewards comprising a rewards type (e.g., points, gift card, discount, or the like) and a rewards amount (e.g., number of points, equivalent monetary value, discounted percentage, or the like).

In some embodiments, an identified digital rewards source may be a second digital rewards profile associated with the same user as the first digital rewards profile associated with the rewards mapping request (as described above at operation 404). In such instances, the first digital rewards profile and the second digital rewards profile may be for the same rewards program system, however, the first digital rewards profile is for collecting rewards related to personal transactions while the second digital reward profile is for business transactions. As another example, the second digital rewards profile may be associated with a different user than the user of the first digital rewards profile. In such instances, the user of the second digital rewards profile may be associated with the user of the first digital rewards profile, e.g., a friend, relative, colleague, or the like. The digital rewards mapping circuitry 208 may leverage the contextual circuitry 216 to identify such associated users through historical data as described in further detail below in connection with FIG. 5C. In other instances, the user of the second digital rewards profile may not be associated with the user of the first digital rewards profile, e.g., at least in such a way that would be identifiable through historical data. For example, the user of the second digital rewards profile may be publically offering, through the digital rewards aggregation system 102, digital rewards for sale and/or trade. In this manner, the user of the second digital rewards profile may publically post an offer for sale and/or trade and define, e.g., by the digital rewards mapping circuitry 208, a purchase price and/or a trade value for at least a portion of the digital rewards associated with the second digital rewards profile. The digital rewards mapping circuitry 208 may further identify such public posting of digital rewards for sale and/or trade as a digital rewards source to other users, e.g., the user of the first digital rewards profile described above. In some embodiments, the digital rewards mapping circuitry 208 may determine that the cost of acquiring publicly posted digital rewards would be equal to or greater than the cost to purchase a desired product or service. In such instances, the digital rewards mapping circuitry 208 may not identify any publicly posted digital rewards that are equal to or greater than a predefined threshold amount representative of a product and/or service cost. Further, the digital rewards mapping circuitry 208 may rank a plurality of publicly posted digital rewards (e.g., based a purchase cost to value ratio) and only identify a subset of the top-ranked publicly posted digital rewards.

In some embodiments, the second digital rewards profile may include an unallocated digital rewards amount that is convertible, by the digital rewards transfer circuitry 212, to at least one of a plurality of digital rewards programs for any of rewards program systems 108A-108N. For example, unallocated digital rewards may be credit card rewards points that can be converted to gift cards associated with a rewards program system. The plurality of digital rewards programs for any of rewards program systems 108A-108N may be associated with one or more of a restaurant, a retailer, a theater, a delivery service, an airline, a rental car service, a hotel service or any other type of merchant or service provider. In some embodiments, the digital rewards mapping circuitry 208 may identify a digital rewards source comprising an unallocated digital rewards amount (e.g., to a user via a user device) and the digital rewards transfer circuitry 212 will convert at least a portion of the unallocated digital rewards amount to digital rewards (e.g., a gift card amount) for a particular digital rewards programs for a particular rewards program systems (e.g., as defined by a user input). In such instances, a user may provide a user input, through a user device or the like, defining a digital rewards program and an amount for converting the unallocated digital rewards. Example embodiments of unallocated digital rewards may include credit card rewards points, credit card gift cards, bank rewards points, and/or any other digital rewards that can be converted to at least one of a plurality of digital rewards programs comprising the digital rewards program.

In some embodiments, an identified digital rewards source may be a promotion offered by a rewards program system. The promotion may be associated with a digital rewards profile of a user. For example, the user may have previously received a discount code, or other promotional coupon, and it may be stored in association with their digital rewards profile. As another example, a rewards program system may automatically offer a promotion (e.g., discount code, etc.) in response to the digital rewards mapping circuitry 208 requesting available promotions from any of rewards program systems 108A-108N.

In some embodiments, an identified digital rewards source may be an incentive multiplier that increases a reward amount of a digital reward, e.g., by a fixed amount, a percentage, or the like. The incentive multiplier may be automatically applied, by the digital rewards mapping circuitry 208, to one or more digital rewards sources based on an incentive score for a digital rewards profile (as described in further detail below in connection with FIG. 5A). The incentive multiplier may be applied automatically to one or more digital rewards sources, or combinations thereof, that are provided (e.g., rendered via a user device) to a user of a digital rewards profile for selection. The incentive multiplier may be applied to one or more digital rewards sources, or combinations thereof, to reward the user for reaching or exceeding an interaction threshold with the digital rewards aggregation system 102. The incentive multiplier may be applied to one or more digital rewards sources, or combinations thereof, to incentivize a user to purchase a product and/or service associated with the particular digital rewards source, or the combinations of digital rewards sources. The incentive multiplier may be applied to one or more digital rewards sources, or combinations thereof, to incentivize a user to purchase or trade for publicly posted digital rewards. For example, the user publicly posting their digital rewards for sale and/or trade may have a particular incentive score, e.g., compared to threshold score (as described in further detail below in connection with FIG. 5A) associated with their digital rewards profile and, as a result, the digital rewards aggregation system 102 may promote their publicly posted digital rewards more frequently and/or with an incentive multiplier. The user that purchases such digital rewards associated with an incentive multiplier may receive the digital rewards purchased plus, e.g., an additional 10% of the value of the digital rewards purchased. In some embodiments, the incentive multiplier may be temporary, e.g., the one or more digital rewards sources, or combinations thereof, applied with the incentive multiplier must be redeemed by a user within a predefined period of time otherwise the incentive multiplier may be reduced, periodically reduced, or removed from the one or more digital rewards sources, or combinations thereof. In other embodiments, the incentive multiplier may persist until any or all of the one or more digital rewards sources, or combinations thereof, applied with the incentive multiplier are redeemed.

In some embodiments, operation 406 may further comprise the performance of additional operations as will be described in greater detail below in connection with FIGS. 5B-5C.

Finally, as shown by operation 408, the apparatus 200 may include means, such as processor 202, memory 204, communications hardware 206, digital rewards mapping circuitry 208, credential circuitry 210, digital rewards transfer circuitry 212, contextual circuitry 216, or the like, for causing transmission of at least one of a predefined digital rewards amount or the promotion of the digital rewards program. In some embodiments, the digital rewards mapping circuitry 208 may provide instructions to the digital rewards transfer circuitry 212 that indicates one or more digital rewards sources, a digital rewards profile, and a digital reward comprising a rewards type and a rewards amount and causes the digital rewards transfer circuitry 212 to cause transmission (e.g., transfer) of the digital rewards from the one or more digital rewards sources to the digital rewards profile. The digital rewards amount to be transferred may be predefined, e.g., by a user input or by instructions provided by a rewards program system. In some embodiments, the digital rewards transfer circuitry 212 may leverage a digital payment system and/or generate a batch file comprising transaction details (as described above) to facilitate operation 408 and/or any sub-operations thereof.

In some embodiments, the digital rewards transfer circuitry 212 may cause transmission of digital rewards in response to a receipt of one or more of (i) a user input to facilitate a purchase transaction of digital rewards, (ii) a user input to facilitate a sale transaction of digital rewards, (iii) a user input to facilitate a trade transaction of digital rewards, (iv) a user input to facilitate a unidirectional exchange of digital rewards (e.g., a gift transaction, consolidation transaction to consolidate rewards from different digital rewards profiles, or the like), (v) a user input to facilitate a purchase transaction of a product and/or a service, and (vi) a user input to facilitate selection of at least one combination of digital rewards sources and products and/or services. In some embodiments, the digital rewards transfer circuitry 212 may cause transmission of digital rewards in response to a receipt of one or more of instructions provided by a rewards program system (e.g., any of rewards program systems 108A-108N). For example, if a purchase transaction for a product is detected in association with a digital rewards profile, a rewards program system may automatically provide instructions to the digital rewards transfer circuitry 212 to transfer digital rewards to the associated digital rewards profile. In such instances, the rewards program system may dynamically generate the digital rewards and/or the rewards may be transferred from one or more digital rewards profiles associated with the issuing entity of the digital rewards program (e.g., a corporate accounting profile or the like).

In some embodiments, the contextual circuitry 216 may at least temporarily record metadata representative of the input that caused the digital rewards transfer (as set forth above). In some such embodiments, the digital rewards transfer circuitry 212 may leverage the contextual circuitry 216 to include the metadata representative of the stimuli that caused the digital rewards transfer with the digital rewards transfer (e.g., in the batch file comprising transaction details). For example, if a first user provides a user input to facilitate a gift transaction to a second user, the contextual circuitry 216 may associate the resulting batch file comprising transaction details with metadata representative of a gift transaction. Further, the user input may indicate that the gift transaction is also an anonymous transaction and, in response, the contextual circuitry 216 may block a portion of the first user's digital rewards profile (e.g., mask/hide identifiable information of the first user) from rendering on a user device for the second user.

In some embodiments, operation 408 may further comprise executing a purchase transaction for a product associated with a digital rewards program. For example, after a rewards transfer from a first digital rewards profile (or other digital rewards source) to a second digital rewards profile is determined to be complete, the digital rewards transfer circuitry 212 may automatically execute a purchase transaction for a product and/or service using at least in part the rewards transferred to the second digital rewards profile. The product and/or service may be indicated by a user input or may have been previously indicated by the user input that initiated the rewards transfer. For example, a user may have provided a user input for selecting a combination of (i) digital rewards sources for a rewards transfer and (ii) products and/or services for a purchase transaction.

In some embodiments, operation 402 may be performed in accordance with the operations described by FIG. 5A. Turning now to FIG. 5A, example operations are shown for determining an incentive score for a digital rewards profile.

As shown by operation 502, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for receiving preference data representative of a preferred digital rewards type of a preferred digital rewards program defined by the user. The preference data may indicate one or more digital rewards that a user is seeking to accumulate for one or more particular digital rewards programs and/or to redeem for one or more particular product and/or service. For example, the preference data of a user may indicate that they want to accumulate airline miles for a particular airline until they reach a predefined threshold amount or that they want to accumulate airline miles without a maximum limit. The preference data may also cause the generation of an automatic alert, e.g., by digital rewards mapping circuitry 208, in an instance that digital rewards for the preferred digital rewards type indicated by the preference data becomes available to the user' digital rewards profile. For example, the digital rewards mapping circuitry 208 may leverage the communications hardware 206 to cause transmission of an alert to a user device when digital rewards for the preferred digital rewards type are offered for sale and/or trade by another user. In some embodiments, the digital rewards mapping circuitry 208 may notify and/or leverage any of rewards program systems 108A-108N to generate custom promotions for a user's digital rewards profile based at least in part on the preference data, e.g., provided by a user input. For example, the digital rewards mapping circuitry 208 may determine based at least in part on interaction data (described is further detail below) for a user that the user is reducing their usage of the digital rewards aggregation system 102 and/or any of rewards program systems 108A-108N. In response, the digital rewards mapping circuitry 208 may cause transmission of the preference data (e.g., representative of a preference for shoes) and instructions to any, or all, of rewards program systems 108A-108N (e.g., associated with a shoe retailer) to generate a custom promotion (e.g., 50% off a pair of shoes, a $10 gift card for a shoe retailer, and/or the like) for one or more digital rewards profiles of the user. The digital rewards mapping circuitry 208 may then alert the user of their custom promotion and/or automatically provide the custom promotion to their digital rewards profile. In some embodiments, the digital rewards aggregation system 102 and/or any of rewards program systems 108A-108N may leverage the preference data, or any other data described herein, to maintain a minimum level of interaction with a user. Interaction with a user may be measured by one or more of a number of user inputs received from the user's user device, an amount of time a user browses data associated with the digital rewards aggregation system 102 and/or any of rewards program systems 108A-108N, or the like. The preference data may also be leverage to maximize interactions with a user.

As shown by operation 504, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for tracking interaction data representative of a number of transactions made from the digital rewards profile of the user. The number of transactions may comprise a total rewards value (e.g., a standardized currency value as described below). Each transaction of the number of transactions may comprise a transaction type representative of a gift transaction, a sale transaction, a purchase transaction, any other transaction, or any interaction described herein. The interaction data may be any recordable and/or quantifiable metric for measuring human-computer interaction (HCl). The interaction data may include location data indicating where the HCl occurred (e.g., at a private residence, in a physical store, etc.). The interaction data may also include interaction context data representative of a current social context for an interaction between two or more users. The interaction data may also include historical data representative of interactions between two or more users through the digital rewards aggregation system 102, any of rewards program systems 108A-108N, and/or other fully or partially digital systems (e.g., mobile networks, social networks, emails, contact lists, etc.). Some example embodiments of interaction data may include one or more of a number of user inputs (e.g., clicks, or the like), an amount of time a user browses data associated with the digital rewards aggregation system 102 and/or any of rewards program systems 108A-108N, a number of transactions completed through the digital rewards aggregation system 102 and/or with any of rewards program systems 108A-108N, an amount of revenue a user has generated for the digital rewards aggregation system 102 and/or any of rewards program systems 108A-108N, or any other metric for quantifying HCl.

In some embodiments, operation 504 may further include normalizing various different types of interaction data (as set forth above) for the same user and/or different users. For example, in addition to tracking interaction data the digital rewards aggregation system 102 may also receive interaction data from any or all of rewards program systems 108A-108N. Additionally, each of rewards program systems 108A-108N dynamically tracking interaction data may provide the interaction data in a non-standardized format. For example, two or more rewards program systems may track a number of rewards points that one user has redeemed over a period of time. However, a first rewards program system may correlate its rewards points as 1 point being equal to $1.00 and the first rewards program system may track the number of rewards points that the user has redeemed on a monthly basis. In contrast, a second rewards program system may correlate its rewards points as 50 points being equal to $1.00 and the second rewards program system may track the number of rewards points that the user has redeemed since they created their digital rewards profile. In such examples, the digital rewards aggregation system 102 may normalize the interaction data from the first rewards program system and/or from the second rewards program system to be comparable with each other and/or in a standardized format. The standardized format for interaction data, or other data described herein, may be defined by the digital rewards aggregation system 102, a plurality of rewards program systems, government agency, non-governmental organization, and/or the like. The standardized format for interaction data may be, for example, representative of a net amount of revenue generated from a digital rewards profile for the digital rewards aggregation system 102 and/or any of rewards program systems 108A-108N over a standardized period of time (e.g., monthly, quarterly, yearly, total, etc.). Example normalization techniques may include statistical analysis techniques (e.g., standard score, Student's t-statistic, Studentized residual, Min-Max featuring scaling, or the like), conversion to a standardized currency value (e.g., 50 points from a first rewards program equals $25.00 and 1000 points from a second rewards program equals €5.00 which further equals $5.82), conversion of non-numeric metrics to numerical metrics (e.g., a digital rewards profile of a user in a target demographic grouping may be indicated with a 1 while a digital rewards profile of a user not in a target demographic grouping may be marked with a 0), and/or the like. Still other normalization techniques may be utilized.

Advantages to utilizing such a standardized format, for interaction data or the like, is that data provided from various different non-standardized sources (e.g., any of rewards program systems 108A-108N, or the like) can be stored via one or more normalized databases (e.g., on storage device 110 or the like) and accessed remotely, in real-time or near-real-time, by the digital rewards aggregation system 102 to quickly provide, for example, combinations of digital rewards sources associated with a product and/or service to a user. Moreover, the one or more normalized databases may be accessed remotely, in real-time or near-real-time, by any of rewards program systems 108A-108N to provide improved tracking of a user utilizing computational resources unique to two or more rewards program systems. For example, location data for a user can be verified for a first location of a first rewards program system (e.g., of a clothing retailer, restaurant, etc.) at a point-of-sale device located at a second location of a second rewards program system (e.g., a movie theatre, rental service, etc.) near the first location (e.g., a neighboring store, in the same shopping complex, etc.). The location data may be verified using the point-of-sale device as described herein.

Finally, as shown by operation 506, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for dynamically calculating an incentive score for the digital rewards profile of the user. The incentive score may be representative of a user's performance across one or more metrics for quantifying HCl as described above in connection with interaction data (e.g., number of clicks, transactions completed, revenue generated, or the like). The incentive score may be individualized for one or more HCl metrics. For example, a user may be assigned a 90th percentile for number of clicks per day compared to other users and the same user may be assigned a 50th percentile score for transactions completed over the past year. The incentive score may include an aggregate score comprising two or more HCl metrics. For example, a user assigned a 90th percentile score for clicks and a 50th percentile score for revenue may be assigned an aggregated incentive score (e.g., average, weighted average, etc.) of 70th percentile overall for their incentive score. The incentive may be calculated for individual digital rewards profiles of the same user, e.g., each digital rewards profile is assigned a score based on data from associated with that particular digital rewards system. The incentive score may also be calculated using aggregated data from all of the user's digital rewards profiles authenticated by the digital rewards aggregation system 102. In such instances, the aggregated incentive score may be assigned to all of the user's digital rewards profiles.

In some embodiments, the incentive score assigned to a digital rewards profile may be utilized to determine whether, or how, to provide particular promotions, incentive multipliers, and/or other benefits for promoting use of at least the digital rewards aggregation system 102 to a user of the digital rewards profile. For example, digital rewards profile with an incentive score equal to or greater than the 50th percentile of all digital rewards profiles of the digital rewards aggregation system 102 may receive a $10.00 gift card for a digital rewards system (e.g., based on associated preference data) once a month. In addition, the gift card value may progressively, or at regular intervals (e.g., 60th, 70th, 80th percentiles, etc.), increase as the incentive score increases. However, in an instance the incentive score is less than the 50th percentile the associated digital rewards profile does not receive any gift card amount or other digital rewards.

In some embodiments, communications hardware 206 may cause transmission of an alert to one or more user devices to indicate whether the one or more digital rewards profiles are eligible for an incentive score-based digital reward and/or promotion. The incentive score alert may further indicate to the user of the user device how they can improve their incentive score to receive an incentive score based digital reward and/or promotion. In some embodiments, the incentive score may at least temporarily (e.g., daily, monthly, onetime purchase, etc.) provide a digital rewards profile with an incentive multiplier as described above. In some embodiments, the incentive score alert may further indicate that the digital rewards profile has been given early access, or priority access, to one or more new digital rewards sources (e.g., not previously available) comprising a preferred digital rewards type (e.g., identified by preference data of the digital rewards profile) based at least in part on an incentive score. In some embodiments, the incentive score may be calculated in real-time or near-real-time, e.g., by contextual circuitry 216. In other embodiments, the incentive score may be calculated, e.g., by contextual circuitry 216, at the end of a time period using interaction data recorded for a digital rewards profile over the time period (e.g., daily, weekly, monthly, annually, etc.).

In some embodiments, operation 406 may be performed in accordance with the operations described by FIG. 5B. Turning now to FIG. 5B, example operations are shown for generating combinations of digital rewards sources available to a digital rewards profile.

As shown by operation 508, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for determining that a combination of the one or more digital rewards sources and the digital rewards amount comprises a rewards value that is equal to or greater than a predefined threshold amount representative of a product cost of the digital rewards program. In some embodiments, operation 508 may be performed based at least in part on the rewards mapping request (as described above at operation 404). In some embodiments, the predefined threshold amount representative of a product cost of the digital rewards program may be one or more of a standardized currency value (e.g., U.S. dollars, Euros, or the like) or a digital rewards value (50,000 points, etc.). In some embodiments, the digital rewards mapping circuitry may access a product cost database associated with a digital rewards system to determine the predefined threshold amount.

As shown by operation 510, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for generating mapping data representative of one or more combinations of the one or more digital rewards sources and the digital rewards amount. Generation of mapping data by the digital rewards mapping circuitry 208 may require leveraging the communication hardware 206 and/or other circuitries to communicate with any of rewards program systems 108A-108N that may store (e.g., via respective databases, storage devices, etc.) data and/or digital rewards associated with one or more of a digital rewards source, digital rewards profile, promotion, and/or any other data associated with a rewards program system as described herein. Further, the digital rewards mapping circuitry 208 may identify any or all digital resources (e.g., digital rewards, digital rewards profiles, security signatures, network services, servers, IP addresses, or the like) required to transfer and/or execute a purchase transaction with the one or more combinations of the one or more digital rewards sources and the digital rewards amount of the mapping data. Furthermore, the digital rewards mapping circuitry 208 may generate instructions, e.g., as part of the generated mapping data, including a sequence of operations for accessing, transferring, and/or utilizing any or all digital resources. For example, the mapping data may be generated with the network location (e.g., IP address and/or directory location) at which data representative of particular digital rewards is stored and the mapping data may further comprise the necessary credentials (e.g., passwords, security signatures, or the like) for accessing and/or transferring the data representative of the particular digital rewards. In this manner, the digital rewards transfer circuitry 212 may leverage at least the credential circuitry 210 to provide at least in part the necessary credentials required of the mapping data. Moreover, the digital rewards mapping circuitry 208 may generate instructions, e.g., as part of the generated mapping data, including a sequence of operations for configuring a display of a user device to render, at least in part, the one or more combinations of the one or more digital rewards sources, the digital rewards amount, a product, and/or service, e.g., indicated by the mapping data.

As shown by operation 512, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for causing transmission of the mapping data comprising instructions to configure a display of a user device to render the one or more combinations of the one or more digital rewards sources and the digital rewards amount. The digital rewards mapping circuitry 208 may leverage the communications hardware 206 for causing transmission of the mapping data comprising any or all instructions and/or digital resources as described above for at least operation 510. The mapping data may be transmitted to one or more of a user device, rewards program system (e.g., point-of-sale device, server, or the like), storage device 110, or the like. For example, a copy of the mapping data may be transmitted a user device for rendering to a user, another copy may be transmitted to the rewards program system to facilitate a transfer and/or purchase transaction using the identified digital rewards, and yet another copy may be recorded to storage device 110 for accounting and/or backup purposes.

Finally, as shown by operation 514, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for receiving a combination request representative of a selection of at least the one or more digital rewards sources by the user and instructions to combine, at least in part, the one or more digital rewards sources selected by the user with the digital rewards amount of the user to execute a purchase transaction. Upon receipt of the transmitted mapping data, a user device may render at least the one or more combinations of the one or more digital rewards sources and the digital rewards amount via at least a display device to a user to review and/or select one or more combinations (as described in further detail below in connection with FIG. 6). The user's selection may than be transmitted back to the communications hardware 206 as a combination request. The combination request may include, or at least indicate, any or all instructions and/or digital resources as described above (e.g., at operations 510-512) for accessing, transferring, and/or utilizing the one or more digital rewards sources selected by the user. In addition, the combination request may include data representative of a product and/or service that the user desires to purchase. For example, the combination request may include instructions to combine the one or more digital rewards sources with a digital rewards profile of the user. The instructions to combine may include a sequence of operations that identifies a network location for each of the one or more digital rewards sources, identifies the necessary credentials (e.g., passwords, security signatures, or the like) for accessing and/or transferring the data representative of the digital rewards associated with each of the one or more digital rewards sources, and causes transfers of the data representative of the digital rewards to the digital rewards profile of the user. Further, the instructions to combine may include additional operations for executing a purchase transaction to cause purchase of a product and/or service identified by the user in the combination request. In some embodiments, operation 514 may further include executing, by the digital rewards transfer circuitry 212, the purchase transaction for a product and/or service associated with the product cost of the digital rewards program based at least in part on the combination request, e.g., received from at least a user device.

In some embodiments, operation 406 may be performed in accordance with the operations described by FIG. 5C. Turning now to FIG. 5C, example operations are shown for generating contextual combinations of digital rewards sources available to digital rewards profiles.

As shown by operation 516, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for receiving location data representative of a current location of a user device of the user. The location data may be generated by, and/or received from, an apparatus 300 (e.g., any of user devices 106A-106N, a point-of-sale device, etc.) using the geolocation circuitry 308 as described above. In some embodiments, operation 516 may further comprise receiving location data representative of a current location of a point-of-sale device, e.g., for authenticating the location data for a user device (as described above). The credential circuitry 210 may be leveraged to authenticate the location data, e.g., comprising digital signatures, user and/or user device identifiable information, or the like (as described above). In some embodiments, location data may include one or more of GPS coordinates, radiolocation coordinates from triangulation between base stations, address information (e.g., number, street, city, province, country, etc.), property information, a credential (e.g., digital signature, or the like) of a point-of-sale device, or the like as described above. Property information included in the location data may indicate whether a property is government owned (e.g., public park, etc.), privately owned (e.g., residential, etc.), whether a business operates at the property (e.g., retailer, entertainment, restaurant, service provider, etc.), contact information (e.g., names, phone numbers, emails, hours of operation, etc.), whether admission is required, whether deliveries are accepted at the location (e.g., food delivery, package delivery, etc.), and/or the like. In some embodiments, the location data may be received, e.g., by communications hardware 206, in real-time or near-real-time, periodically at discrete time intervals (e.g., every 1 millisecond, 30 seconds, 10 minutes, hourly, etc.), continuously over a period of time, or the like. In some embodiments, operation 516 may be performed for a plurality of users, user devices, digital rewards profiles, and/or the like.

As shown by operation 518, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for dynamically generating a geofence defining one or more boundaries around the current location of the user device. The geofence circuitry 214 may receive the location data via the communications hardware 206 and process the location data to determine where a particular device is located (e.g., user device, point-of-sale device, etc.). In some embodiments, the geofence circuitry 214 may extract coordinates from the location data that indicate the location of physical structural boundaries near, or around, where the particular device is located. In other embodiments, the geofence circuitry 214 may leverage the communication hardware 206 to communicate with a geolocation mapping service (e.g., Google Maps™, global position system (GPS), and/or the like) as described above. The geolocation mapping service may provide additional location data that indicates the location of physical structural boundaries near, or around, where the particular device is located. Once the geofence circuitry 214 identifies the location of physical structural boundaries near, or around, where the particular device is located, the geofence circuitry 214 may generate one or more geofence based on the structural boundaries identified. In some embodiments, a geofence may be generated based on a plurality of location data received from a plurality of sources (e.g., two or more of the apparatus 300). For example, if a first user device provides location data indicating that the first user is at a movie theater a geofence may be generated around the movie theater (e.g., representative of the movie theatre's building, individual theaters, the lobby, etc.). In an instance, a second user device provides location data indicating that the second user is at the same movie theater the same geofence data may be utilized for the second user. Advantages to such crowdsourcing of geofence data between users (e.g., whether or not they are related by interaction context data) may include conservation of computing resources not only of the digital rewards aggregation system 102 but also for any geolocation mapping services and/or communication networks (e.g., cellular networks, etc.) that facilitate the generation of a geofence. Other advantages are that the generated geofence may be updated with higher levels of resolution overtime as more users transit the geofence area and provide additional location data. For example, if two users enter the movie theater through different side entrances, geofence circuitry 214 may update the geofence to further include each entrance location in the physical structural boundaries. In some embodiments, a point-sale-device may transmit a predefined geofence to the geofence circuitry 214 through communication hardware 206 in an instance the location of a user device is authenticated via the point-of-sale device. In this manner, the point-sale-device may include geofence data that is predefined for a particular location (e.g., map of a shopping complex), a particular event (e.g., a concert confined to only half of the venue location), building renovations (e.g., second floor concession stand is closed for remodeling), or the like. In some embodiments, operation 518 may be performed for a plurality of users, user devices, digital rewards profiles, and/or the like.

As shown by operation 520, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for automatically identifying a second user device within the geofence. As described above at operation 518, a second user device may provide location data indicating that the second user is within the geofence generated in response to the location data received from the first user device. The geofence circuitry 214 may automatically identify, or categorize, the second user as being at the same location as the first user upon receipt of the second user's location data. In some embodiments, the second user device may provide location data indicating that the second user is near (e.g., proximate, within 10 meters of, within a 10 minute walk of, or the like) the geofence. In such instances, geofence circuitry 214 may automatically identify, or categorize, the second user as being at the same location as the first user upon detect that the second user device (e.g., via updated location data) has crossed one or more boundaries defined by the geofence generated in response to the location data received from the first user device. In some embodiments, the geofence circuitry 214 may generate one or more databases for each geofence and each database may define a list of user devices (e.g., any of user devices 106A-106N) and/or point-of-sale devices currently identified within each geofence. The one or more databases for each geofence may be at least temporarily stored via storage device 110, or the like, and dynamically updated as user devices are detected entering and exiting the geofence. In some embodiments, a geofence and/or any associated databases thereof may be dynamically deleted, e.g., by geofence circuitry 214, upon detection that any or all user devices and/or point-of-sale devices have been removed from the geofence and/or any associated databases. In some embodiments, operation 520 may be performed for a plurality of users, user devices, digital rewards profiles, and/or the like.

As shown by operation 522, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for determining historical data representative of at least one of a past transaction or a past communication between the user and the second user. Historical data may be representative of interactions between the two or more users through the digital rewards aggregation system 102, any of rewards program systems 108A-108N, other fully or partially digital systems (e.g., mobile networks, social networks, emails, contact lists, etc.) and/or the like as described herein. In response to identifying that a first user device and a second user device are within the geofence (as described above) contextual circuitry 216 may leverage the communications hardware 206 to automatically request historical data associated with the first user device and/or the second user device. For example, contextual circuitry 216 may query the storage device 110 for any historical data (e.g., stored mapping data associated with digital rewards profiles of each user, or the like) using identifiable information associated with each user of each user device. Further, contextual circuitry 216 may query a rewards program system associated with the geofence (generated at operation 518) for any historical data (e.g., past transactions data associated with digital rewards profiles of each user, or the like) using identifiable information associated with each user of each user device. Furthermore, contextual circuitry 216 may request a contact list (e.g., vCards, virtual contact file (.vfc), or the like) from the first user device and/or the second user device and upon receipt of one or more contact lists the contextual circuitry 216 may access the one or more contact lists to determine if any identifiable information (e.g., name, phone number, email, etc.) for a respective user is stored within the other user's contact list. Moreover, contextual circuitry 216 may request communication log data (e.g., SMS text logs, phone logs, etc.) from the first user device and/or the second user device and upon receipt of communication log data from the one or more user devices the contextual circuitry 216 may access the respective communication log data to determine if any identifiable information (e.g., name, phone number, email, etc.) for a respective user is stored within the other user's communication log data. In response to a request and/or query (as described above) from contextual circuitry 216, one or more of user devices 106A-106N and/or rewards program systems 108A-108N may cause transmission of the requested information to at least contextual circuitry 216. In some embodiments, operation 522 may be performed for a plurality of users, user devices, digital rewards profiles, and/or the like.

As shown by operation 524, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for predicting interaction context data representative of a current social context for the user and the second user. In some embodiments, operation 524 may include predicting interaction context data representative of a current social context for a plurality of users, user devices, digital rewards profiles, and/or the like. Interaction context data may include a predefined list of social situations, each social situation associated with at least two attributes: (i) a probability of certainty that the social situation correlates to the current social context for the plurality of users; and (ii) whether the social situation is appropriate for sharing digital rewards between two or more users of the plurality of users.

For example, contextual circuitry 216 may predict, with a high probably of certainty (e.g., 90% or higher), that a plurality of users are gathered for a birthday party (i.e., the social situation) at a private residence and that sharing digital rewards is appropriate. Contextual circuitry 216 may predict that the social situation is a birthday party based, at least in part, on a calendar invite communication received by one or more of the plurality of users matching the current date and/or time. Further, the contextual circuitry 216 may leverage the geofence circuitry 214 to determine that the plurality of users are located within a geofence around the private residence of one of the plurality of users (e.g., based on property information from a geolocation mapping service). Furthermore, contextual circuitry 216 may determine (e.g., based on identifiable information in the calendar invite communication, based on a birthdate associated with one or more digital rewards profiles, or the like) which user of the plurality of users is the birthday user for the birthday party. In some embodiments, contextual circuitry 216 may determine that the birthday user should be included in mapping data for sharing digital rewards, e.g., when generating mapping data for the plurality of users to purchase pizzas for the party. In some embodiments, contextual circuitry 216 may determine that the birthday user should be excluded from mapping data for sharing digital rewards, e.g., when generating mapping data for the other users of the plurality of users to purchase a gift. In some embodiments, the contextual circuitry 216 may leverage the digital rewards mapping circuitry 208 to generate mapping data for the other users of the plurality of users to purchase a gift in advance of the birthday party (e.g., 2 weeks before the party date indicated by the calendar invite communication). In some embodiments, contextual circuitry 216 may leverage the digital rewards mapping circuitry 208 and/or digital rewards transfer circuitry 212 to alert individual users that they can transfer a gift transaction (e.g., gift card value, promotion for a free service and/or product, or the like) to a digital rewards profile of the birthday user.

Still with reference to operation 524, predicting interaction context data, e.g., by contextual circuitry 216, may be facilitated by one or more predictive modeling techniques including supervised and/or unsupervised artificial neural networks (e.g., a feedforward artificial neural network, probabilistic artificial neural network, etc.), or the like. In some embodiments, operation 524 may further include generating interaction context data, e.g., by contextual circuitry 216, based on one or more supervised and/or unsupervised artificial neural networks (e.g., perceptron, multilayer perceptron, or the like) utilizing location data, historical data, geofence data, interaction data, and/or any other information described herein as input data for the input layer of the artificial neural network. In some embodiments, an artificial neural network may comprise an input layer include at least one input node, one or more hidden layers each comprising at least one hidden node, and an output layer comprising at least one output node. In some embodiments, any or all input data may be parsed into individual elements that can be processed by at least the individual nodes of the input layer of the artificial neural network. Parsing of input data may be performed by a parsing algorithm (e.g., an executable neural semantic parser, or the like), e.g., included at least in part with contextual circuitry 216, before the input data is transmitted to the input layer of the artificial neural network. In some embodiments, the parsed input data may be transmitted to one or more input nodes of the input layer of the artificial neural network.

One or more input nodes of the input layer may apply a weight to each data element of the input data which that respective node processes. Each input node of the input layer of the artificial neural network may then transmit any or all data elements, which that respective node processed, to at least one hidden node of a hidden layer of the artificial neural network. Each hidden node of the hidden layer of the artificial neural network may perform one or more mathematical and/or statistical operations on any or all data elements received (e.g., weighting, multiplication, subtraction, higher order functions, etc.). Each hidden node of the hidden layer of the artificial neural network may then transmit any or all data elements, which that respective node processed, to another hidden node of another hidden layer of the artificial neural network and/or to an output node of an output layer of the artificial neural network. In some embodiments, a hidden node may transmit any or all data elements processed thereby to one or more other hidden nodes of another hidden layer of the artificial neural network. The output layer of the artificial neural network may be utilized by contextual circuitry 216 to determine interaction context data. In some embodiments, contextual circuitry 216 may utilize additional machine learning techniques to improve performance of the artificial neural network for individual users over-time (e.g., backpropagation, or the like). Advantages to utilizing artificial neural networks, or the like, for predicting interaction context data (as described above) is that artificial neural networks, or the like, can receive and process input data from various different sources remotely in real-time, or near-real-time, more quickly respond to the changing social context of interactions between users (e.g., a user joins friends at a theatre, a user exits a residential party, etc.)

As shown by operation 526, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for determining a contextual product available for purchase within the geofence or deliverable to the geofence. A contextual product available for purchase within a geofence may be any product and/or service available for purchase to a user located within a retail store, stadium, theater, market, or the like. Further, a contextual product available for purchase within a geofence may be concessions available for purchase at a movie theater, sporting event, or the like. A contextual product deliverable to a geofence may include food from a delivery service (e.g., pizza, etc.), a product deliverable to a residence, an in-home service (e.g., maid service, etc.) or the like. In some embodiments, contextual circuitry 216 may determine whether the geofence is a restricted location that will not accept and/or allow for delivery, e.g., a movie theater, restaurant, or the like may not permit delivery of outside food).

Contextual circuitry 216 may determine a contextual product available for purchase within the geofence or deliverable to the geofence based, at least in part, on the interaction context data and the geofence. A contextual product may be any product and/or service that is considered appropriate, with a high probability of certainty (e.g., 85% or higher) for a social situation of the interaction context data. For example, a children's toy may be a contextual product associated with a child's birthday party (i.e., the social situation). However, a children's toy may not be a contextual product associated with an adult's birthday party. Interaction context data, as described above at operation 524, including the predefined list of social situations, each social situation may be further associated with at least a third attribute including a predefined list of one or more contextual products and/or services deemed appropriate for the respective social situation. Contextual circuitry 216 may leverage the communications hardware 206 and/or digital rewards mapping circuitry 208 to identify one or more products and/or services of any of rewards program systems 108A-108N that correlate with the one or more contextual products and/or services deemed appropriate for the respective social situation. In this manner, digital rewards mapping circuitry 208 may also generate mapping data for the one or more identified products and/or services and communications hardware 206 may provide the mapping data to one or more user devices associated with at least the interaction context data.

In some embodiments, probability of certainty may be calculated by an artificial probabilistic neural network. In some embodiments, contextual circuitry 216 may determine that a user is waiting in-line to check out at a retailer, to purchase tickets at a venue, or the like and in response, the contextual circuitry 216 may leverage the digital rewards mapping circuitry 208 and/or communications hardware 206 to cause transmission of an alert to the user to indicate that the user has available digital rewards that they can utilize at their current location.

Finally, as shown by operation 528, the apparatus 200 includes means, such as processor 202, memory 204, communications hardware 206, digital rewards mapping circuitry 208, credential circuitry 210, digital rewards transfer circuitry 212, geofence circuitry 214, contextual circuitry 216, or the like, for determining a contextual combination of at least the digital rewards amount of the digital rewards profile and the second digital rewards amount of the second digital rewards profile. Contextual circuitry 216 may leverage the digital rewards mapping circuitry 208 to generate mapping data, as described above in connection with at least operation 510, representative of one or more contextual combinations of at least first digital rewards of a digital rewards profile and second digital rewards of a second digital rewards profile and/or any other digital rewards source. In some embodiments, the contextual combination comprises a rewards value that is equal to or greater than a predefined threshold amount representative of a product and/or service cost of the contextual product and/or contextual service.

Turning next to FIG. 6, example operations are shown for rendering combinations of digital rewards sources available to a digital rewards profile, e.g., via a display device of any of user devices 106A-106N.

As shown by operation 602, the apparatus 300 includes means, such as processor 302, memory 304, communications hardware 306, geolocation circuitry 308, user interface circuitry 310, or the like, for receiving mapping data comprising instructions to configure a display of the user device to render one or more combinations of the one or more digital reward sources and the digital reward amount. The mapping data may be received by communications hardware 306, e.g., of any of user devices 106A-106N, and may be the same or substantially similar to the mapping data described above in connection with at least operations 510, 512, 528, and/or the like.

As shown by operation 604, the apparatus 300 includes means, such as processor 302, memory 304, communications hardware 306, geolocation circuitry 308, user interface circuitry 310, or the like, for generating, with a first display area value, first combination data representative of a first combination of the one or more combinations of the one or more digital rewards sources and the digital rewards amount. The first combination data may be further representative of a product and/or service that is redeemable for the one or more digital rewards sources and the digital rewards amount of the first combination. The first display area value may be representative of a size (e.g., in pixels, centimeters, or the like) associated with rendering the first combination data on a display device. The first display area value may be determined based, at least in part, on a type and/or model of a user device and/or an attribute of an associated display device (e.g., screen size, or the like). The first display area value may be determined based at least in part on a ranking of the first combination data compared to the second combination data and/or a plurality of other combination data. For example, if the second combination is ranked higher than the first combination data the first display area value may be smaller than the second display area value proportional to the difference in ranking between the first combination data and the second combination data. Ranking of a plurality of combination data may be predetermined by the mapping data, e.g., by digital rewards mapping circuitry 208, and may be determined based on preference data, lowest product and/or service cost after digital rewards are applied to the purchase transition, and/or the like as described herein.

As shown by operation 606, the apparatus 300 includes means, such as processor 302, memory 304, communications hardware 306, geolocation circuitry 308, user interface circuitry 310, or the like, for generating, with a second display area value, second combination data representative of a second combination of the one or more combinations of the one or more digital rewards sources and the digital rewards amount. The second combination data may be further representative of a product and/or service that is redeemable for the one or more digital rewards sources and the digital rewards amount of the second combination. The second display area value may be representative of a size (e.g., in pixels, centimeters, or the like) associated with rendering the second combination data on a display device. The second display area value may be determined based, at least in part, on a type and/or model of a user device and/or an attribute of an associated display device (e.g., screen size, or the like). In some embodiments, a display area value (e.g., first, second, third, etc. display area value) may be dynamically updated in response to a user providing a user input indicative of the user not wanting to select and/or further display particular combination data. For example, if the first combination data and the second combination data are both rendered via a display device, as described below, and the use provides a user input to remove the second combination data than the first combination data may be dynamically adjusted to render with a larger first display area value (e.g., proportional to a ranking of the first combination data and any other remaining the combination data).

Finally, as shown by operation 608, the apparatus 300 includes means, such as processor 302, memory 304, communications hardware 306, geolocation circuitry 308, user interface circuitry 310, or the like, for rendering, on a display device, the first combination data and the second combination data. In some embodiments, the first combination data and/or the second combination data may be rendered in a predefined order on the display device according to a predefined ranking determined, at least in part, from the mapping data e.g., received at operation 602 described above. Additionally, the first combination data and/or the second combination data may be rendered in size proportional to their rank within the predefined ranking as describe above. In some embodiments, the mapping data and the predefined ranking may be associated with a plurality of combination data (e.g., third, fourth, etc.). In some embodiments, the user device may be configured to receive one or more user inputs via user interface circuitry 310 comprising the display device. For example, a user may press, with a finger, on the first combination data rendered on the display device and swipe their finger right to provide a user input for removing the first combination data from the display device. User interface circuitry 310 may dynamically update the display device to reorganize the remaining combination data rendered to the screen based on at least in part on the predefined ranking with the first combination data removed. Further, the user may tap or click on the second combination data to provide a user input for selecting, at least in part, the second combination of the one or more combinations of the one or more digital rewards sources and the digital rewards amount represented by the second combination data. In some embodiments, the user input for selecting one or more combinations may cause generation of a combination request, by the user device, and transmission of the combination request to the digital rewards aggregation system 102. The combination request may be the same or similar to the combination request described above for at least operation 514 and/or the like.

FIGS. 4, 5A-5C, and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved distribution of digital rewards between third parties. Example embodiments thus provide tools that overcome the problems faced by traditional rewards programs for mapping available digital rewards from various different digital rewards sources. By avoiding the need to manually track individual digital rewards across multiple rewards programs, example embodiments thus save time and resources, while also eliminating the possibility of human error that has been unavoidable in the past. Further, embodiments described herein incentivize the user to engage digitally with digital rewards programs by automatically tracking and quantifying interaction data for the user and providing digital rewards incentives based on higher interaction numbers. Furthermore, embodiments described herein provide additional layers of security and authentication to prevent dishonest users, or other bad actors (e.g., hackers, etc.), from claiming digital rewards by falsifying data to meet rewards requirements (e.g., location data, etc.). Moreover, some example embodiments convert non-standardized data from among different rewards program systems to a standardized format that can be accessed remotely, in real-time or near-real-time, to quickly respond to users based on their predicted social situation. Additionally, as describe herein embodiments may utilize machine learning (e.g., neural networks, etc.) to quickly predict the social situation for groups of users and provide promotions, products, and/or service in real-time, or near-real-time, to prevent users from missing out on opportunities to utilize their available rewards both individually and as a group. Still further embodiments described herein automatically alert users of available digital rewards based on their current location which assists in increased user interaction with the rewards program system and also results in less monetary and computing resources being allocated to maintain forgotten digital rewards profiles. Finally, by automating functionality that has historically required human analysis, the speed and consistency of the evaluations performed by example embodiments unlocks many potential new functions that have historically not been available, such as the ability to conduct rewards transfers, e.g., across multiple rewards programs, and monitor for fraudulent activities in real-time or near-real-time.

As these examples all illustrate, example embodiments contemplated herein provide technical solutions that solve real-world problems faced during social events where a group of individuals desire, or are required, to combine their digital resources. And while loyalty programs have struggled with this issue for years, the recently exploding amount of data made available by the recently emerging interconnected technologies of today have made this problem significantly more acute, as the expectation of secure and easy tracking of digital resources including digital rewards has grown while traditional rewards programs have failed to keep up with these expectations. At the same time, the recently arising ubiquity of mobile devices, GPS tracking, and secured digital point-of-sale devices has unlocked new avenues to solving these problems that have not historically been available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for distributing digital rewards between third parties, the method comprising:

receiving, by communications hardware, rewards data representative of at least a digital rewards profile comprising a digital rewards amount for a digital rewards program of a user;

receiving, by the communications hardware, a rewards mapping request comprising instructions to identify one or more available digital rewards sources compatible with the digital rewards amount;

receiving, by the communications hardware and from a first user device, user location data representative of a first user device location;

determining, by geolocation circuitry, using a satellite-based radio navigation system and based on the first user device location, geofence location data representative of a geofence location;

identifying, by digital rewards mapping circuitry and based on the rewards mapping request, the geofence location data, and the rewards data, one or more digital rewards sources associated with the geofence location, wherein the one or more digital rewards sources comprises one or more of a second digital rewards profile comprising a second digital rewards amount or an incentive multiplier;

authenticating, by credential circuitry, the user location data based on (i) an identification of the first user device to a point-of-sale device using active or passive near-field communication protocols, and (ii) a determination that the point-of-sale device is associated with the geofence location, wherein the first user device and the point-of-sale device include respective near-field communication circuits; and in response to authenticating the user location data, causing transmission, by digital rewards transfer circuitry and from the one or more digital rewards sources to the digital rewards profile, of at least one of a predefined digital rewards amount of the digital rewards program.

2. The method of claim 1, further comprising:

determining, by the digital rewards mapping circuitry, that a combination of the one or more digital rewards sources and the digital rewards amount comprises a rewards value that is equal to or greater than a predefined threshold amount representative of a product cost of the digital rewards program;

generating, by the digital rewards mapping circuitry and based on identifying the one c more digital rewards sources, mapping data representative of one or more combinations of the one or more digital rewards sources and the digital rewards amount;

causing transmission, by the communications hardware, of the mapping data comprising instructions to configure a display of a user device to render the one or more combinations of one or more digital rewards sources and the digital rewards amount;

receiving, by the communications hardware, a combination request representative of a selection of at least the one or more digital rewards sources by the user and instructions to combine, at least in part, the one or more digital rewards sources selected by the user with the digital rewards amount of the user; and combining, by the digital rewards transfer circuitry and based on the combination request the one or more digital rewards sources selected by the user with the digital rewards amount of the user.

3. The method of claim 1, further comprising:

receiving, by the communications hardware, preference data representative of a preferred digital rewards type of a preferred digital rewards program defined by the user;

tracking, by contextual circuitry and in real-time, interaction data representative of a number of transactions made from the digital rewards profile of the user, wherein the number of transactions comprises a total rewards value, wherein each transaction of the number of transactions comprises a transaction type representative of a gift transaction, a sale transaction, or a purchase transaction; and dynamically calculating, by the contextual circuitry and based on the interaction data, an incentive score for the digital rewards profile of the user, wherein the digital rewards profile of the user is notified of, and given early access to, new digital rewards sources comprising the preferred digital rewards type based at least in part on the incentive score.

4. The method of claim 1, wherein the second digital rewards profile is associated, by credential circuitry, with a second user, and wherein the second user defines, by the digital rewards mapping circuitry, a purchase price or a trade value for at least a portion of the second digital rewards amount.

5. The method of claim 1, wherein the second digital rewards profile is associated, by credential circuitry, with a second user, wherein the second user causes transmission, by the digital rewards transfer circuitry, of at least a portion of the second digital rewards amount to the digital rewards profile of the user, wherein the portion of the second digital rewards amount is associated, by contextual circuitry, with metadata representative of a gift transaction, and wherein at least a portion of the second digital rewards profile of the second user is blocked, by the credential circuitry, from rendering on a display of a user device of the user.

6. The method of claim 1, wherein the second digital rewards amount of the second digital rewards profile is an unallocated digital rewards amount that is convertible, by the digital rewards transfer circuitry, to at least one of a plurality of digital rewards programs comprising the digital rewards program, and wherein each of the plurality of digital rewards programs are associated with at least one of a restaurant, a retailer, a theater, a delivery service, an airline, a rental car service, or a hotel service.

7. The method of claim 1, further comprising:

receiving, by the communications hardware, location data representative of a current location of a user device of the user;

dynamically generating, by geofence circuitry and based on the current location of the user device, a geofence defining one or more boundaries around the current location of the user device, wherein the geofence is generated based on structural boundaries identified from a geolocation mapping service at the current location of the user device; and automatically identifying, by contextual circuitry and based on the geofence, a second user device within the geofence, wherein the second user device is identified with the second digital rewards profile of a second user that is compatible with the digital rewards profile of the user.

8. The method of claim 7, further comprising:

determining, by contextual circuitry and based on the digital rewards profile and the second digital rewards profile, historical data representative of at least one of a past transaction or a past communication between the user and the second user;

predicting, by the contextual circuitry and based on the geofence and the historical data, interaction context data representative of a current social context for the user and the second user;

determining, by the contextual circuitry and based on the interaction context data and the geofence, a contextual product available for purchase within the geofence or deliverable to the geofence; and determining, by the contextual circuitry and based on the interaction context data and the contextual product, a contextual combination of at least the digital rewards amount of the digital rewards profile and the second digital rewards amount of the second digital rewards profile, wherein the contextual combination of at least the digital rewards amount of the digital rewards profile and the second digital rewards amount comprises a rewards value that is equal to or greater than a predefined threshold amount representative of a product cost of the contextual product.

9. The method of claim 8, wherein the digital rewards profile and the second digital rewards profile are associated, by the digital rewards mapping circuitry, with a respective digital rewards program, and wherein the respective digital rewards program is determined to be redeemable within the geofence.

10. An apparatus for distributing digital rewards between third parties, the apparatus comprising:

communications hardware configured to:

receive rewards data representative of at least a digital rewards profile comprising a digital rewards amount for a digital rewards program of a user, and receive a rewards mapping request comprising instructions to identify one or more available digital rewards sources compatible with the digital rewards amount;

receive, from a first user device, user location data representative of a first user device location;

geolocation circuitry configured to determine, using a satellite-based radio navigation system and based on the first user device location, geofence location data representative of a geofence location;

digital rewards mapping circuitry configured to identify, based on the rewards mapping request, the geofence location data, and the rewards data, one or more digital rewards sources associated with the geofence location, wherein the one or more digital rewards sources comprises one or more of a second digital rewards profile comprising a second digital rewards amount or an incentive multiplier;

credential circuitry configured to authenticate the user location data based on (i) an identification of the first user device to a point-of-sale device using active or passive near-field communication protocols, and (ii) a determination that the point-of-sale device is associated with the geofence location, wherein the first user device and the point-of-sale device include respective near-field communication circuits; and digital rewards transfer circuitry configured to, in response to authenticating the user location data, cause transmission, from the one or more digital rewards sources to the digital rewards profile, of at least one of a predefined digital rewards amount of the digital rewards program.

11. The apparatus of claim 10, wherein the digital rewards mapping circuitry is further configured to:

determine that a combination of the one or more digital rewards sources and the digital rewards amount comprises a rewards value that is equal to or greater than a predefined threshold amount representative of a product cost of the digital rewards program, and generate, based on identifying the one or more digital rewards sources, mapping data representative of one or more combinations of the one or more digital rewards sources and the digital rewards amount;

wherein the communications hardware is further configured to:

cause transmission of the mapping data comprising instructions to configure a display of a user device to render the one or more combinations of the one or more digital rewards sources and the digital rewards amount, and receive a combination request representative of a selection of at least the one or more digital rewards sources by the user and instructions to combine, at least in part, the one or more digital rewards sources selected by the user with the digital rewards amount of the user; and wherein the digital rewards mapping circuitry is further configured to combine, based on the combination request, the one or more digital rewards sources selected by the user with the digital rewards amount of the user.

12. The apparatus of claim 10, wherein the communications hardware is further configured to receive preference data representative of a preferred digital rewards type of a preferred digital rewards program defined by the user; and wherein the apparatus further comprises contextual circuitry configured to:

track, in real-time, interaction data representative of a number of transactions made from the digital rewards profile of the user, wherein the number of transactions comprises a total rewards value, wherein each transaction of the number of transactions comprises a transaction type representative of a gift transaction, a sale transaction, or a purchase transaction, and dynamically calculate, based on the interaction data, an incentive score for the digital rewards profile of the user, wherein the digital rewards profile of the user is notified of, and given early access to, new digital rewards sources comprising the preferred digital rewards type based at least in part on the incentive score.

13. The apparatus of claim 10, wherein the second digital rewards profile is associated, by credential circuitry, with a second user, and wherein the second user defines, by the digital rewards mapping circuitry, a purchase price or a trade value for at least a portion of the second digital rewards amount.

14. The apparatus of claim 10, wherein the second digital rewards profile is associated, by credential circuitry, with a second user, wherein the second user causes transmission, by the digital rewards transfer circuitry, of at least a portion of the second digital rewards amount to the digital rewards profile of the user, wherein the portion of the second digital rewards amount is associated, by contextual circuitry, with metadata representative of a gift transaction, and wherein at least a portion of the second digital rewards profile of the second user is blocked, by the credential circuitry, from rendering on a display of a user device of the user.

15. The apparatus of claim 10, wherein the second digital rewards amount of the second digital rewards profile is an unallocated digital rewards amount that is convertible, by the digital rewards transfer circuitry, to at least one of a plurality of digital rewards programs comprising the digital rewards program, and wherein each of the plurality of digital rewards programs are associated with at least one of a restaurant, a retailer, a theater, a delivery service, an airline, a rental car service, or a hotel service.

16. The apparatus of claim 10, wherein the communications hardware is further configured to receive location data representative of a current location of a user device of the user;

wherein the apparatus further comprises geofence circuitry configured to dynamically generate, based on the current location of the user device, a geofence defining one or more boundaries around the current location of the user device, wherein the geofence is generated based on structural boundaries identified from a geolocation mapping service at the current location of the user device; and wherein the apparatus further comprises contextual circuitry configured to automatically identify, based on the geofence, a second user device within the geofence, wherein the second user device is identified with the second digital rewards profile of a second user that is compatible with the digital rewards profile of the user.

17. The apparatus of claim 16, wherein the contextual circuitry is further configured to:

determine, based on the digital rewards profile and the second digital rewards profile, historical data representative of at least one of a past transaction or a past communication between the user and the second user;

predict, based on the geofence and the historical data, interaction context data representative of a current social context for the user and the second user;

determine, based on the interaction context data and the geofence, a contextual product available for purchase within the geofence or deliverable to the geofence; and determine, based on the interaction context data and the contextual product, a contextual combination of at least the digital rewards amount of the digital rewards profile and the second digital rewards amount of the second digital rewards profile, wherein the contextual combination of at least the digital rewards amount of the digital rewards profile and the second digital rewards amount comprises a rewards value that is equal to or greater than a predefined threshold amount representative of a product cost of the contextual product.

18. The apparatus of claim 17, wherein the digital rewards profile and the second digital rewards profile are associated with a respective digital rewards program, and wherein the respective digital rewards program is determined to be redeemable within the geofence.

19. A computer program product for distributing digital rewards between third parties, the computer program product comprising at least one non-transitory computer-readable storage medium storing software instructions that, when executed, cause an apparatus to:

receive rewards data representative of at least a digital rewards profile comprising a digital rewards amount for a digital rewards program of a user;

receive a rewards mapping request comprising instructions to identify one or more available digital rewards sources compatible with the digital rewards amount;

receive user location data representative of a first user device location;

determine, at least in part using a satellite-based radio navigation system and based on the first user device location, geofence location data representative of a geofence location;

identify, based on the rewards mapping request, the geofence location data, and the rewards data, one or more digital rewards sources associated with the geofence location, wherein the one or more digital rewards sources comprises one or more of a second digital rewards profile comprising a second digital rewards amount or an incentive multiplier;

authenticate, by credential circuitry, the user location data based on (i) an identification of the first user device to a point-of-sale device using active or passive near-field communication protocols, and (ii) a determination that the point-of-sale device is associated with the geofence location, wherein the first user device and the point-of-sale device include respective near-field communication circuits; and in response to authenticating the user location data, cause transmission, from the one or more digital rewards sources to the digital rewards profile, of at least one of a predefined digital rewards amount of the digital rewards program.

20. The computer program product of claim 19, wherein the software instructions, when executed, further cause the apparatus to:

determine that a combination of the one or more digital rewards sources and the digital rewards amount comprises a rewards value that is equal to or greater than a predefined threshold amount representative of a product cost of the digital rewards program;

generate, based on identifying the one or more digital rewards sources, mapping data representative of one or more combinations of the one or more digital rewards sources and the digital rewards amount;

cause transmission of the mapping data comprising instructions to configure a display of a user device to render the one or more combinations of the one or more digital rewards sources and the digital rewards amount;

receive a combination request representative of a selection of at least the one or more digital rewards sources by the user and instructions to combine, at least in part, the one or more digital rewards sources selected by the user with the digital rewards amount of the user; and combine, based on the combination request, the one or more digital rewards sources selected by the user with the digital rewards amount of the user.

* * * * *